(12) United States Patent
Sibbach et al.

(10) Patent No.: US 12,365,149 B1
(45) Date of Patent: Jul. 22, 2025

(54) AUTOMATED FIBER PLACEMENT ASSEMBLY WITH PRESSURE ROLLER

(71) Applicant: GENERAL ELECTRIC COMPANY, Schenectady, NY (US)

(72) Inventors: Arthur William Sibbach, Boxford, MA (US); Nicholas Joseph Kray, Mason, OH (US); Douglas Lorrimer Armstrong, Needham, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/608,482

(22) Filed: Mar. 18, 2024

(51) Int. Cl.
*B29C 70/38* (2006.01)
*B29C 70/34* (2006.01)

(52) U.S. Cl.
CPC ............ *B29C 70/384* (2013.01); *B29C 70/34* (2013.01)

(58) Field of Classification Search
None
See application file for complete search history.

(56) References Cited

U.S. PATENT DOCUMENTS

| 4,015,320 | A | | 4/1977 | Mackel et al. |
| 6,114,012 | A | * | 9/2000 | Amaoka ............ B29D 99/0007 244/119 |
| 6,126,770 | A | | 10/2000 | Lee et al. |
| 6,453,962 | B1 | | 9/2002 | Pratt |
| 7,249,943 | B2 | * | 7/2007 | Benson ................. B29C 70/541 425/374 |
| 8,057,621 | B2 | * | 11/2011 | Kohler .................. B31F 1/2836 156/472 |
| 8,206,531 | B2 | | 6/2012 | Portoles |
| 8,684,058 | B2 | | 4/2014 | Byerley |
| 9,327,456 | B2 | * | 5/2016 | Shindo .................... B29C 43/24 |
| 2022/0234311 | A1 | | 7/2022 | Berastegui |

FOREIGN PATENT DOCUMENTS

| DE | 4312827 C1 | 5/1994 |
| JP | H10333401 A | 12/1998 |
| KR | 19980014416 U | 6/1998 |

OTHER PUBLICATIONS https://www.researchgate.net/figure/Schematic-of-the-automated-fiber-placement-process_fig1_341844335, accessed Dec. 4, 2023.

* cited by examiner

*Primary Examiner* — Barbara J Musser
(74) *Attorney, Agent, or Firm* — McGarry Bair PC

(57) ABSTRACT

The disclosure herein relates to an automated fiber placement assembly for forming a component by the successive layering of strips of fiber tows with a pressure roller. The pressure roller has a rotational axis about which the pressure roller rotates to apply the strip of fiber tows to the component. The pressure roller can be shaped complementary to a non-uniform surface of the component for even application of the strip of fiber tows to the component.

19 Claims, 14 Drawing Sheets

AUTOMATED FIBER PLACEMENT ASSEMBLY WITH PRESSURE ROLLER

TECHNICAL FIELD

The present disclosure relates generally to an automated fiber placement assembly for forming composite parts, and particularly, to a pressure roller for applying strips of fiber tows during fiber placement to form the composite parts.

BACKGROUND

Many components, such as those for a turbine engine, are made from composite materials that can include a fiber-reinforced matrix and exhibit a high strength-to-weight ratio. Due to the high strength-to-weight ratio and moldability to adopt relatively complex shapes, composite materials are utilized in various applications. Components made from composite materials can be used in aviation applications, for example, such as forming at least a portion of one or more of the fuselage, wings, rudder, manifold, turbine engine, airfoil, blades, vanes, or other components of the aircraft.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
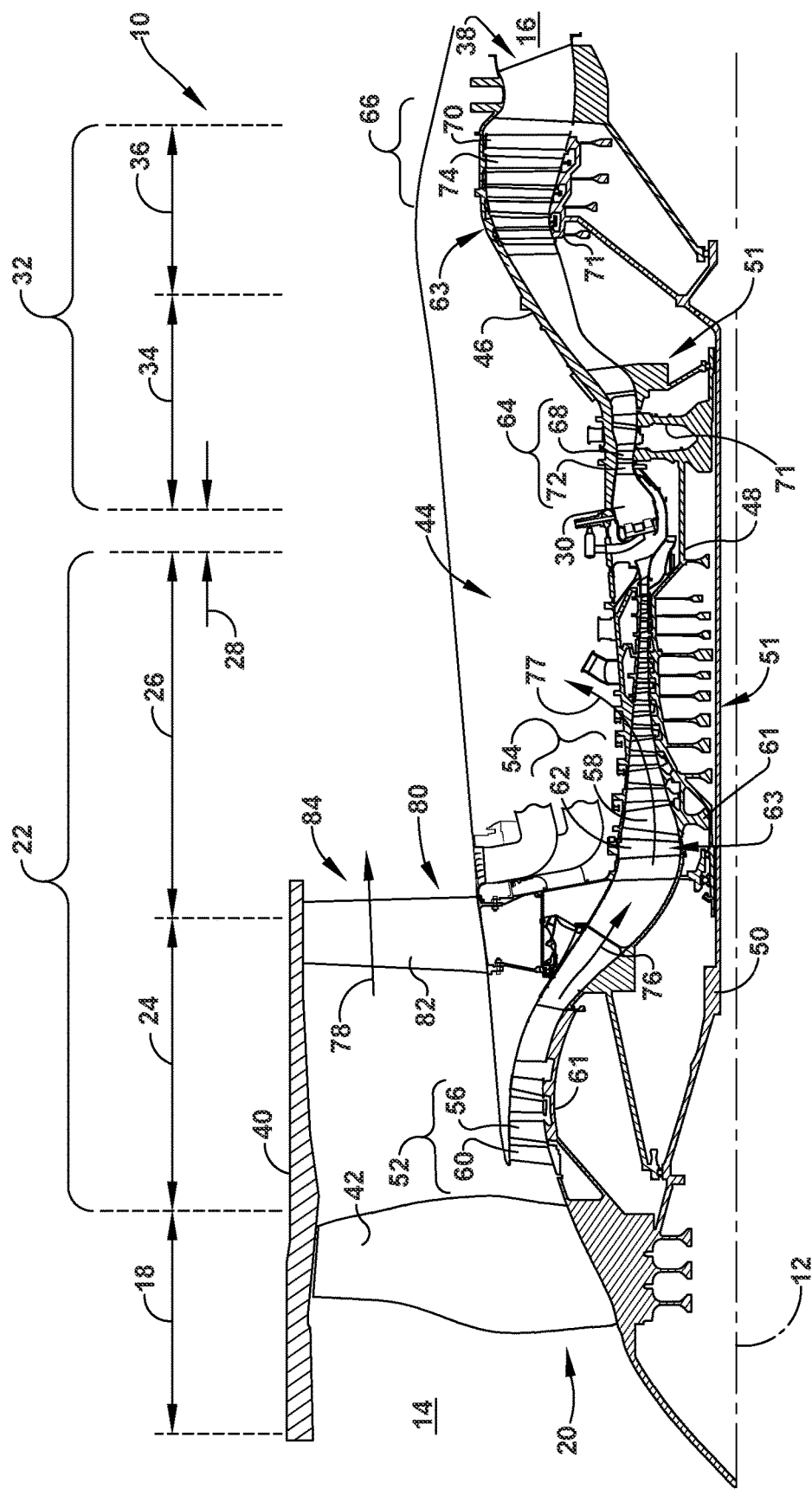
FIG. 1 is a schematic sectional view of a turbine engine in accordance with an exemplary aspect of the present disclosure.

Aspects of the disclosure herein are directed to a system and method for forming a component, such as a component for a turbine engine, or any other components that can be fully or partially formed by automated fiber placement (AFP) assemblies or machines. Automated fiber placement machines can be used to lay successive layers of fiber tows to build or add to a component. Components can include simple geometric shapes, but are often complex, resulting in overhanging tow ends or less-than-ideal application of fiber tows resultant of the complex shapes of the component to be formed.

As described herein, the automated fiber placement assembly can be used to form components or apply fiber tows during the forming of components, such as engine components used in a turbine engine for an aircraft. Such engine components can be an airfoil, for example, such as for a fan blade. It should be understood that the disclosure can apply similarly to other components of the turbine engine, such as a combustor liner or a disk in non-limiting examples, as well as non-aircraft, non-turbine, or non-engine components. While described in terms of a component for a turbine engine, it will be appreciated that the present disclosure can apply to any component and need not be specific to a turbine engine or aircraft.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first," "second," and "third" may be used interchangeably to distinguish one component from another and are not intended to signify location or importance of the individual components.

As used herein, the term "upstream" refers to a direction that is opposite the fluid flow direction, and the term "downstream" refers to a direction that is in the same direction as the fluid flow. The terms "fore" or "forward" mean in front of something and "aft" or "rearward" mean behind something.

The term "fluid" may be a gas or a liquid, or multi-phase.

As used herein, the terms "complementary" or "complement" are used herein to mean that a first aspect of the invention is shaped with respect to another aspect or feature. For example, a concave shape for a pressure roller described herein is complementary to a convex shape of a non-uniform surface, with the concave shape being shaped with respect to the convex feature, such that the concave shape of the pressure roller matches the convex shape of the non-uniform surface.

As used herein, the term "varied physical configuration" means a variation in the physical structure of an object, such as a pressure roller described herein. Such a variation in physical structure can include a change in physical structure defined in a direction, such as an axial direction, a radial direction, a circumferential direction, a span-wise direction, a chord-wise direction, or a direction specific to the object, like among a direction defined between opposing ends of the object, relative to a rotational axis of the pressure roller, or nearer or further from an interior or exterior surface. The physical structure can vary defined in one of the directions.

As used herein, the term "varied material configuration" means a variation in the materials forming an object, such as a pressure roller described herein. Such a variation in materials can include different materials or utilizing materials having different material properties, such as hardness, elasticity, or yield strength in non-limiting examples. In one example, different portions of the pressure roller can use different materials or materials having different material properties. The variation in the materials can be defined relative to a direction, such as an axial direction, a radial direction, a circumferential direction, a span-wise direction, a chord-wise direction, or a direction specific to the object, like among a direction defined between opposing ends of the object, a rotational axis of the pressure roller, or nearer or further from an interior or exterior surface.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, higher, lower, front, back, top, bottom, above, upstream, downstream, forward, aft, etc.) as may be used herein are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that those two elements are directly connected and in fixed relation to one another. The exemplary drawings are for purposes of illustration only and the dimensions, positions, order, and relative sizes reflected in the drawings attached hereto can vary.

The singular forms "a," "an," and "the" include plural references unless the context clearly dictates otherwise. Furthermore, as used herein, the term "set" or a "set" of elements can be any number of elements, including only one.

As used herein, the term "non-uniform" may be used as defining a shape or a surface of a component or a substrate that is not homogenous, uniform, regular, or constant. The non-uniformity can be defined extending in one or more directions along the surface of the component or the substrate. While the non-uniform surface can be patterned, it is patterned only among a portion of the surface and not the entirety of the surface of the component or substrate.

As used herein, the term "material property" may be used as defining an inherent or intrinsic property of the particular material for an element or feature of the disclosure contained herein, such as that of the material for a pressure roller. The "material property" as used herein can be an elasticity, a hardness, or a yield strength, in non-limiting examples, which can relate to the amount of permitted deformation under pressure or force, or resistance thereto, for the particular material. Such a material property can be defined by the materials used to form the element or feature or defined by the manufacture process to create the element or feature.

As used herein, the term "elasticity" may be used as defining the modulus of elasticity under tension or compression and may relate to an elasticity for a particular material or structure made of such material, such as the engine components described herein. The elasticity can represent the stress per unit area relative to the local strain or proportional deformation thereof or can be represented as a bulk modulus or a yield strength, as a ratio of force to deformation.

As used herein, the term "hardness" may be used as defining a material property that defines resistance to deformation as a result of indentation or abrasion. A hardness can include a scratch hardness, an indentation hardness, or a rebound hardness in non-limiting examples. Hardness can be measured as Newtons per square millimeter, or can be represented by a Brinell hardness number, a Vickers hardness number, or a Rockwell hardness number in non-limiting examples.

As used herein, the term "yield strength" may be used as defining a material property that defines the limit of elastic behavior and the beginning plastic behavior. A force acting upon a material that does not exceed the yield strength limit can deform, while returning to its original shape, while a force that does exceed the yield strength limit will begin to deform without returning to its original shape. The yield strength can be defined as an elastic limit or a yield point in non-limiting examples.

The term "composite," as used herein is, is indicative of a component having two or more materials. A composite can be a combination of at least two or more metallic, non-metallic, or a combination of metallic and non-metallic elements or materials. Examples of a composite material can be, but are not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

Additionally, as used herein, a "controller" or "controller module" can include a component configured or adapted to provide instruction, control, operation, or any form of communication for operable components to affect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

Additionally, as used herein, elements being "electrically connected," "electrically coupled," "communicatively coupled" or "in electrical communication," as well as terminology similar thereto, can include an electric, wired or wireless, transmission or signal being sent, received, or communicated to or from such connected or coupled elements. Furthermore, such electrical connections or couplings can include a wired or wireless connection, or a combination thereof.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines and vanes), combustors, shrouds, and other like components, which would benefit from the lighter-weight and higher temperature capability these materials can offer.

The inventors' practice has proceeded in the designing of a system used in the manufacture of a component onto a substrate, such as an airfoil, and designing the system to have improved tow fiber application, adhesion, and bond, particularly to a component having a non-uniform surface. This system is utilized during the design and creation of several different types of components, such as those utilized in the turbine engine shown in FIG. 1, as well as non-aircraft or non-turbine engine applications where composite components are used.

FIG. 1 is a schematic cross-sectional diagram of a turbine engine 10 for an aircraft. The turbine engine 10 has a generally longitudinally extending axis or engine centerline 12 extending from a forward 14 to an aft 16. The turbine engine 10 includes, in a downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by a core casing 46, which can be coupled with the fan casing 40.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the greater diameter annular HP spool 48, drivingly connects the LP turbine 36 to the LP compressor 24 and fan 20. The HP and LP spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor 24, 26 can be mounted to (or integral to) a disk 61, which is mounted to the corresponding one of the HP and LP spools 48, 50. The static compressor vanes 60, 62 for a stage of the compressor 24, 26 can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine 34, 36 can be mounted to a disk 71, which is mounted to the corresponding one of the HP and LP spools 48, 50. The static turbine vanes 72, 74 for a stage of the compressor 24, 26 can be mounted to the core casing 46 in a circumferential arrangement.

Complementary to the rotor portion, the stationary portions of the turbine engine 10, such as the static compressor and turbine vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and an exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components for cooling. The temperature of pressurized airflow 76 entering the combustor 30 is significantly increased above the bleed air temperature. The bleed air 77 may be used to reduce the temperature of the core components downstream of the combustor 30.

A remaining portion of the pressurized airflow 76 bypasses the LP compressor 24 and engine core 44 as a bypass airflow 78 and exits the turbine engine 10 through a stationary vane row, and more particularly an outlet guide vane assembly 80, comprising a plurality of airfoil guide vanes 82, at a fan exhaust side 84. More specifically, the plurality of airfoil guide vanes 82 can be arranged in a circumferential row of radially extending airfoil guide vanes 82 that are utilized adjacent to the fan section 18 to exert some directional control of the bypass airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
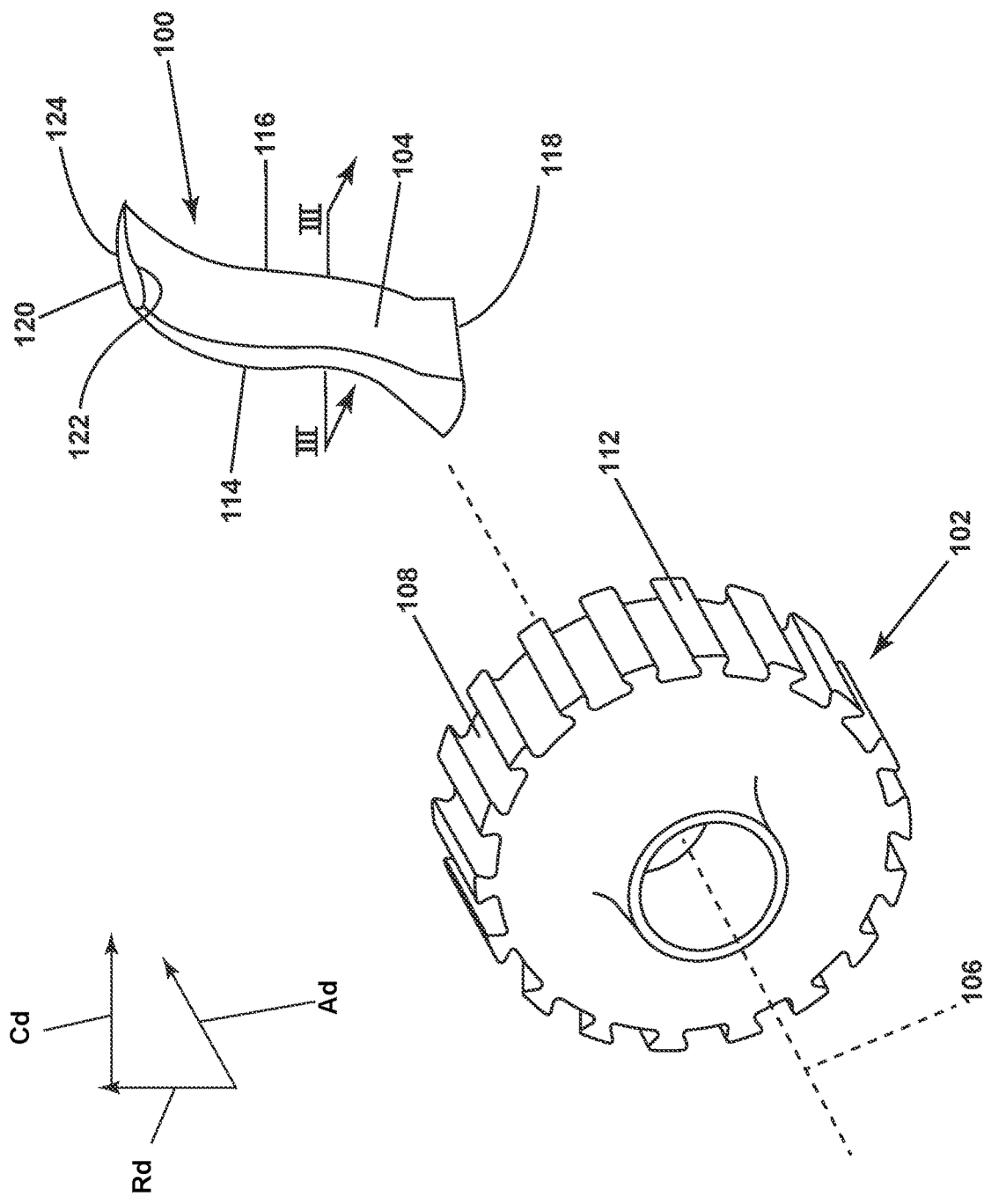
FIG. 2 is a schematic isometric view of a composite airfoil assembly and disk assembly suitable for use within the turbine engine of FIG. 1, in accordance with an exemplary aspect of the present disclosure.

FIG. 2 is a schematic isometric view of a composite airfoil 100 and a disk 102 suitable for use within the turbine engine 10 of FIG. 1. The composite airfoil 100 can define a body 104. The disk 102 is suitable for use as the disk 61, 71 (FIG. 1) or any other disk such as, but not limited to, a disk within the fan section 18 (FIG. 1), the compressor section 22 (FIG. 1), or the turbine section 32 (FIG. 1) of the turbine engine 10 (FIG. 1). The composite airfoil 100 can be rotating or non-rotating such that the composite airfoil 100 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42 (FIG. 1). As a non-limiting example, the composite airfoil 100 can be a composite fan blade.

The composite airfoil 100, and the body 104 thereof, extends between a leading edge 114 and a trailing edge 116 to define a chord-wise direction, and extends between a root 118 and a tip 120 to define a span-wise direction. The composite airfoil 100 includes a pressure side 122 and a suction side 124.

The disk 102 can be rotatable or stationary about a rotational axis 106. The rotational axis 106 can coincide with, be parallel to, or be offset from the engine centerline 12 (FIG. 1). The disk 102 includes a plurality of slots 108 extending axially through a radially exterior surface 112 of the disk 102. The plurality of slots 108 are circumferentially spaced about the disk 102, with respect to the rotational axis 106, and permit the composite airfoil 100 to slidably secure to the disk 102.

The composite airfoil 100 couples to the disk 102 by inserting at least a portion of the composite airfoil 100 into a respective slot of the plurality of slots 108. The composite airfoil 100 is held in place by frictional contact with the slot 108 or can be coupled to the slot 108 via any suitable coupling method such as, but not limited to, welding, adhesion, fastening, or the like. While only a single composite airfoil 100 is illustrated, it will be appreciated that there can be any number of composite airfoils 100 coupled to the disk 102. As a non-limiting example, there can be a plurality of composite airfoil 100 corresponding to a total number of slots of the plurality of slots 108.

For the sake of reference, a set of relative reference directions, along with a coordinate system can be applied to the composite airfoil 100 and the disk 102. An axial direction (Ad) can extend from forward to aft and is shown extending at least partially into the page. The axial direction (Ad) and can be arranged parallel to the rotational axis 106, which can also be arranged parallel to the engine centerline 12 (FIG. 1). A radial direction (Rd) extends perpendicular to the axial direction (Ad), which can extend perpendicular to the engine centerline 12. A circumferential direction (Cd) can be defined perpendicular to the radial direction (Rd), which can be defined as a ray extending from a curvature or along a curvature of a circumference about the axial direction (Ad), can be defined as a ray extending locally from the radial direction (Rd), and/or can be defined along the circumference of the turbine engine 10 (FIG. 1) relative to the engine centerline 12 (FIG. 1) or rotational axis 106.

Figure 3:
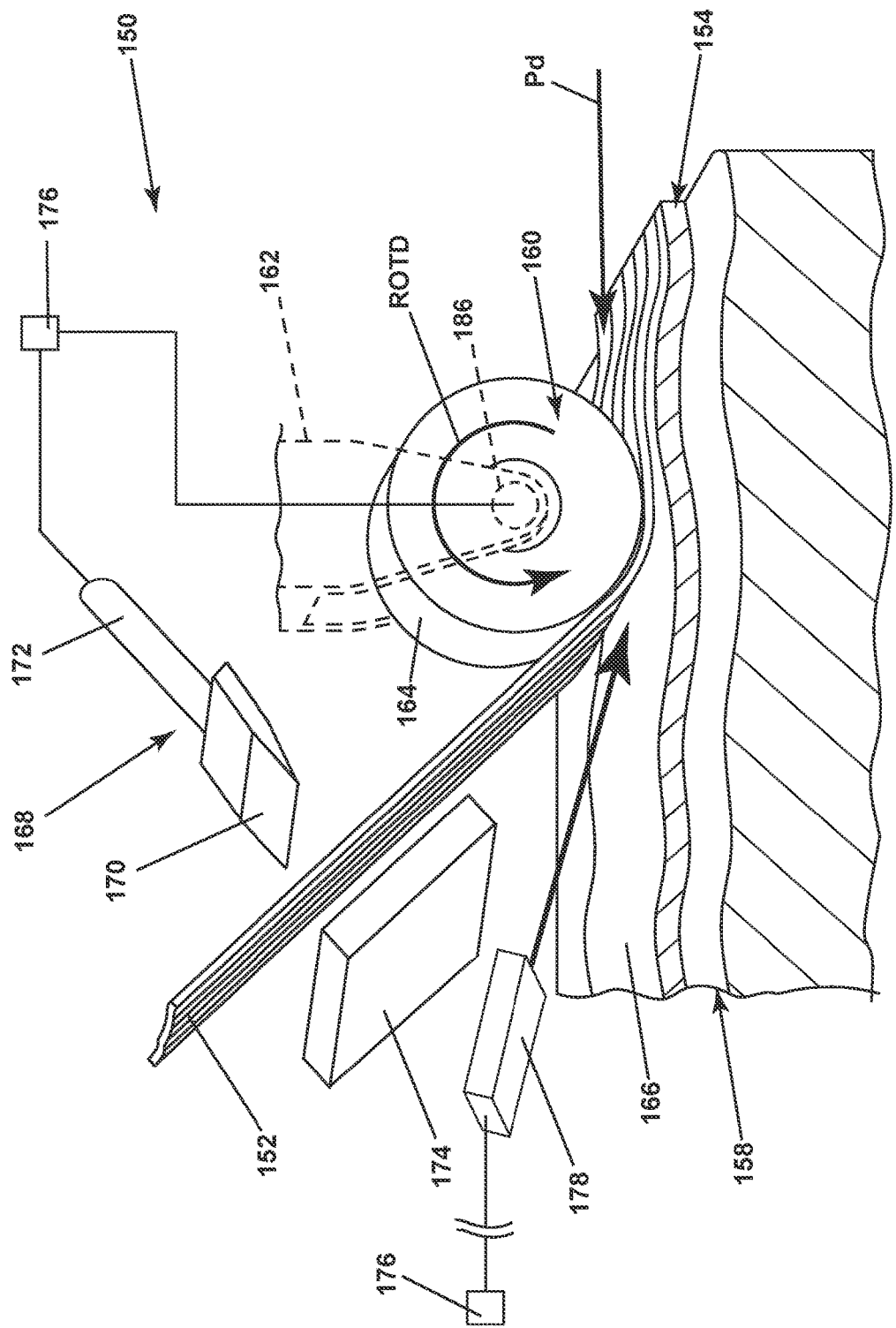
FIG. 3 is a schematic isometric view of an automated fiber placement assembly with a pressure roller for forming the composite airfoil assembly of FIG. 2, in accordance with an exemplary aspect of the present disclosure.

FIG. 3 illustrates a schematic perspective view of an automated fiber placement assembly 150 that applies a strip of fiber tows 152 to a component 154 at least partially forming the component 154. In one non-limiting example, the component 154 can be the composite airfoil 100 of FIG. 2, while other non-airfoil components, composite components, or non-turbine engine components are contemplated. The component 154 can be a substrate 158. The substrate 158 can be defined as the component 154 being formed, for example, such as having one or more strips of fiber tows 152 already laid to form the component 154, while alternative substrates such as a mandrel or workpiece, are contemplated, without having the laid strips of fiber tows 152. The component 154 or the substrate 158 has a non-uniform surface 166, upon which the strip of fiber tows 152 are placed.

A pressure roller 160, suspended by a mount 162, is rotated in a rotating direction (ROTD) to apply the strip of fiber tows 152 to the component 154. The pressure roller 160 includes an exterior surface 164, which contacts the strip of fiber tows 152 during application to the component 154. The pressure roller 160, or exterior surface 164 thereof, can be shaped complementary to the non-uniform surface 166 upon which the strip of fiber tows 152 is being applied, and is discussed in greater detail herein. The pressure roller 160 imparts a pressure to the strip of fiber tows 152 against the component 154 during application to facilitate adhesion or bonding. The pressure roller 160 can be made of a compliant material, such as one or more of urethane, rubber, or polymers in non-limiting examples. Multiple layers or stacks of strips of fiber tows 152 can be applied in this manner in order to form the component 154 onto the substrate 158. In one non-limiting example, the pressure roller 160 can be covered by a non-stick coating, such as a polytetrafluoroethylene, while alternate adhesion resistant or low friction materials are contemplated.

A cutter assembly 168 includes a cutter head 170 coupled to an actuator 172 that actuates the cutter head 170 to cut the strip of fiber tows 152 against a backplate 174. The actuator 172, for example, can include a driver, such as a motor or cylinder which reciprocates the cutter head 170 to cut the strip of fiber tows 152.

A controller 176 operatively and communicatively couples to the pressure roller 160 to control application speed of the strip of fiber tows 152 at the pressure roller. Additionally, it is contemplated that the controller 176 is communicatively coupled, operatively coupled, or both, to additional elements of the automated fiber placement assembly 150, such as the cutter assembly 168 in a non-limiting example. The controller 176 can control the speed or the rate of passage of the strip of fiber tows 152 through control of rotation of the pressure roller 160, such as control of a motor 186 rotating the pressure roller 160 operated by the controller 176.

A heat source 178 can be provided to heat one or both of the component 154 or a surface of the strip of fiber tows 152 that contacts the component 154, while any positioning is contemplated. The heat source 178 provides heat in order to pre-cure, activate, or otherwise facilitate adhesion or application of the strip of fiber tows 152 to the component 154, in addition to the pressure applied by the pressure roller 160. For example, resins provided within the strip of fiber tows 152 can be activated by the addition of heat, which can adhere to the component 154 or the strip of fiber tows 152 already laid. The heat source 178 can be operably or communicatively coupled to the controller 176 in order for the controller 176 to control one or both of the application of heat or the temperature of the applied heat.

During operation, rotation of the pressure roller 160 in the rotating direction (ROTD) lays successive strips of fiber tows 152 in a placement direction (Pd) to form the component 154 upon the substrate 158. The shape of the pressure roller 160 can be defined complementary to the non-uniform surface 166, such as by having variations in shape from that of basic geometric shapes like that of a cylindrical pressure roller, such as having local peaks or valleys, or other features complementary to the non-uniform surface 166, which can provide a varied local pressure applied by the pressure roller 160 during application to permit an even or near-even application of pressure across the strip of fiber tows 152 by the pressure roller 160.

Figure 4:
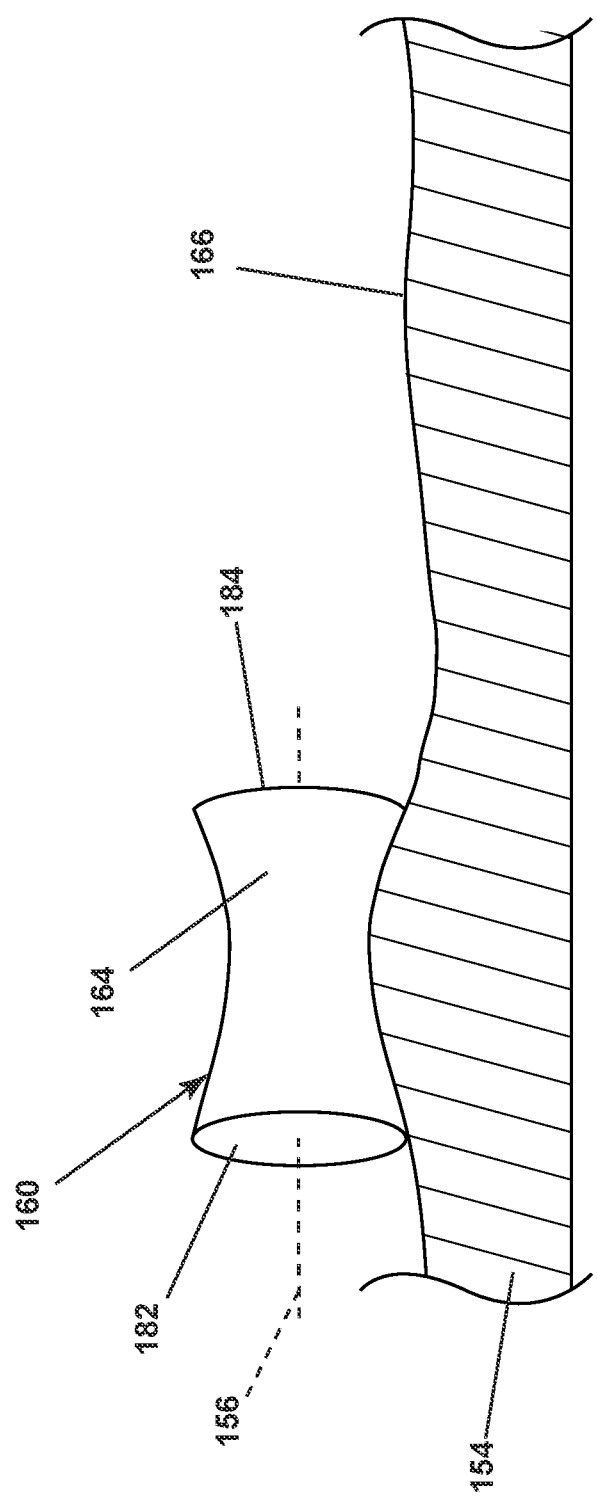
FIG. 4 is a schematic isometric view of the pressure roller positioned along a non-planar portion of the composite airfoil assembly, in accordance with an exemplary aspect of the present disclosure.

FIG. 4 shows an isometric view of the pressure roller 160 having a varied physical configuration, taken at a slightly offset angle from the placement direction (Pd) of FIG. 3, and isolated from the remainder of the automated fiber placement assembly 150 (FIG. 3). The pressure roller 160 extends between a first end 182 and an opposing second end 184 and rotates about a rotational axis 156 during application. The exterior surface 164 of the pressure roller 160 is shaped complementary to a portion the non-uniform surface 166 of the component 154. The pressure roller 160 can be defined as non-cylindrical with a decreasing-then-increasing diameter extending between the first and second ends 182, 184. The rate at which the diameter increases or decreases between the first and second ends 182, 184 can define a curvature for the pressure roller 160, such that the curvature is elliptical in order to complement a similar rounded or elliptical shape of the non-uniform surface 166. The pressure roller 160 can be substantially cylindrical, or having a substantially rounded or circular cross-sectional shape, to permit rolling along the component 154, while the particular shape can vary from a pure cylindrical shape, as defined by the varying diameters or features of the pressure roller 160. Such a variation from cylindrical can permit the pressure roller 160 to complement the shape of the non-uniform surface 166. It should be appreciated that any suitable shape for the pressure roller 160 is contemplated, such that the shape is complementary to the non-uniform surface 166 and capable of applying the strip of fiber tows 152 (FIG. 3) to the component 154 with an even or substantially even pressure across the pressure roller 160. Additional non-limiting examples for shapes for the exterior surface 164 can include circular, oval, rounded, linear, curvilinear, or combinations thereof, while local or discrete variations in shape can be utilized to complement similar local or discrete variations in the non-uniform surface 166. In another non-limiting example, the shape of the exterior surface 164 of the pressure roller 160 can be a mirror of that of the non-uniform surface 166, such that the exterior surface 164 matches or complements the non-uniform surface 166 as it rolls to apply the strip of fiber tows 152 (FIG. 3).

In operation, rotation of the pressure roller 160 applies a pressure to the strip of fiber tows 152 (FIG. 3) across the pressure roller 160 and against the component 154. The geometry of the pressure roller 160 is complementary to the shape of the non-uniform surface 166, providing local increases or decreases in thickness for the pressure roller 160 that align with similar decreases or increases in diameter for the pressure roller 160, such that an even pressure or a substantially even pressure is applied to the component 154 across the entirety of the pressure roller 160 from the first end 182 to the second end 184. In a non-limiting example, such a variation can be no more than 5% variation in the pressure applied across the pressure roller 160. In this way, even pressure can be applied by the pressure roller 160, despite the non-uniform shape of the component 154. Such a uniform application of pressure along the non-uniform surface 166 provides for improved or increased bonding, and consistent application of the strip of fiber tows 152 (FIG. 3) to the component 154.

Additionally, during operation, it is contemplated that the pressure roller 160 can be interchangeable or replaceable. More specifically, the pressure roller 160 can be removed from the mount 162 (FIG. 3) and replaced with another pressure roller, with each pressure roller 160 having a shape complementary to a different portion of the non-uniform surface 166 of the component 154. For example, the non-uniform surface 166 may have a non-uniformity that is wider than the pressure roller 160 or having a non-uniformity with a size greater than that of the area covered by one revolution of the pressure roller 160. In such an example, in order to achieve a uniform pressure across the entirety of the non-uniform surface 166, multiple pressure rollers 160 can be utilized to apply the strip of fiber tows 152 (FIG. 3), with each pressure roller 160 being shaped complementary to a different portion of the non-uniform surface 166. In this way, the pressure rollers 160 can be removed or interchanged during operation in order to apply the strip of fiber tows 152 (FIG. 3) across the entirety of a component 154 being larger than that of the individual pressure roller 160 itself. In a non-limiting example, the pressure roller 160 can be removed and interchanged manually, by a user operating the automated fiber placement assembly 150, or the pressure roller 160 can be interchanged by an automated system, which may or may not be incorporated as part of the automated fiber placement assembly 150. Such interchanging may be automated, for example. Incorporation of interchanging or replacing of the pressure roller 160 by an automated system can include physically removing and replacing the pressure roller 160, such as with mechanical features such as a motor and actuator system adapted to secure, remove, and replace one or more pressure rollers 160 within the automated fiber placement assembly 150. In such an example, the automated fiber placement assembly 150, or a user or operator thereof, can select the pressure rollers 160 from a set of pressure rollers 160 utilized in forming the component 154, where each pressure roller 160 can be shaped to different portions of the non-uniform surface 166. It is contemplated that the automated fiber placement assembly 150 can include a controller, memory, and instructions, such as software or programming instructions for automatically changing pressure rollers 160 in order to complement different non-uniform shapes of the underlying component 154 during formation.

Figure 5:
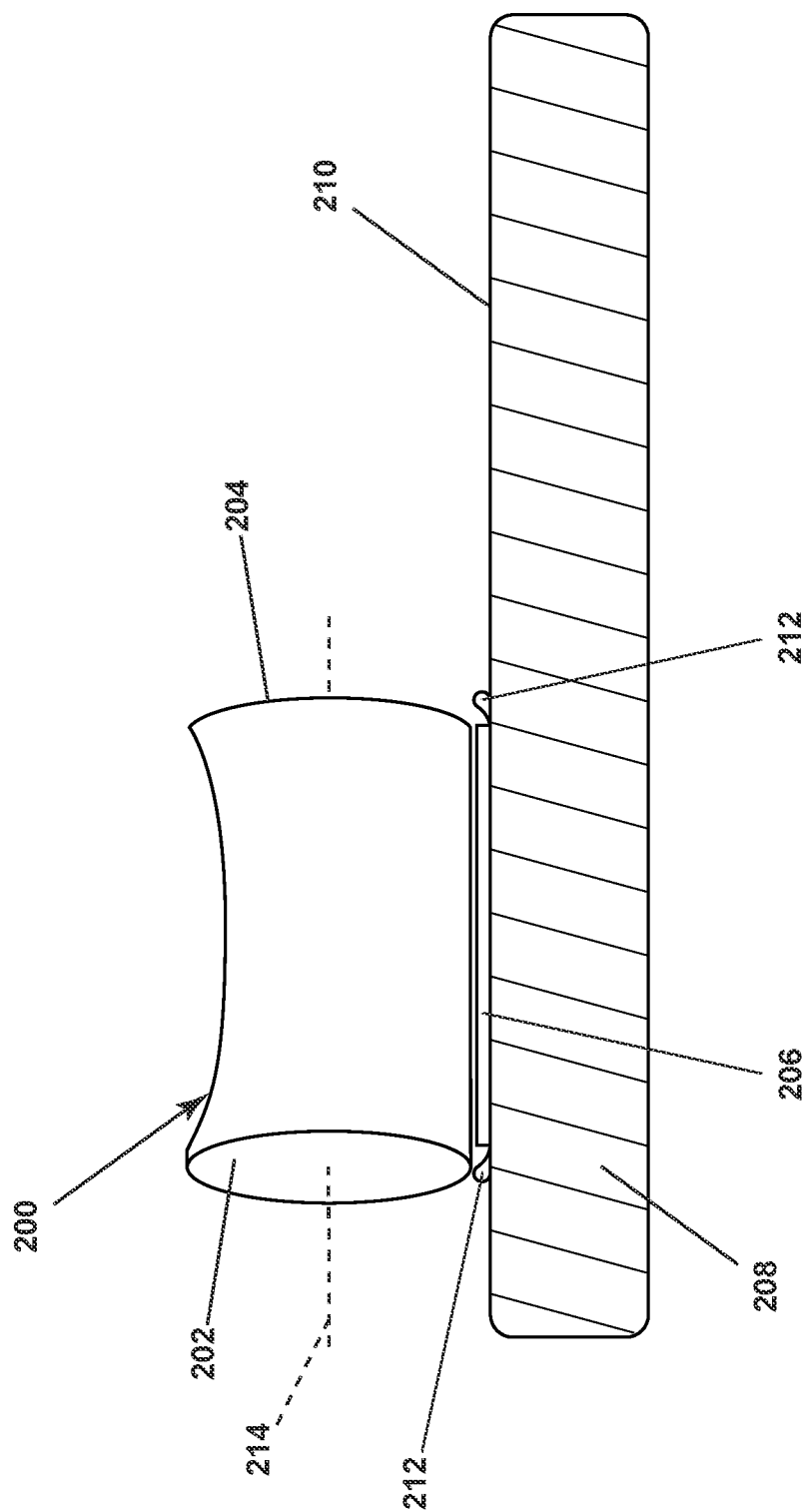
FIG. 5 is a schematic isometric view of an alternate pressure roller, for use with an automated fiber placement assembly, applying pressure to a strip of fibers with an adhesive, in accordance with an exemplary aspect of the present disclosure.

FIG. 5 shows an isometric view of an exemplary pressure roller 200 having a varied physical configuration, extending between a first end 202 and an opposing second end 204, for applying a strip of fiber tows 206 to a component 208 by rotating about a rotational axis 214. It should be appreciated that while the component 208 is shown to have a flat or planar exterior surface 210, a non-uniform surface is contemplated for the exterior surface 210, similar to the non-uniform surface 166 of FIGS. 3-4.

During forming of the component 208, the adhesive 212 can be utilized to facilitate bonding of the strip of fiber tows 206 to the component 208. In one example, the strip of fiber tows 206 can be impregnated with an adhesive, such as a resin, while a separate adhesive can be applied to the strip of fiber tows 206. During application, the pressure applied by the pressure roller 200 can result in at least some of the adhesive 212 being squeezed out from between the pressure roller 200 and the component 208. Such a squeeze out of adhesive 212 can be exacerbated by a non-uniform surface for the exterior surface 210. Utilizing a shaped pressure roller 200 can define local increases or decreases in the pressure applied by the pressure roller 200. Specifically, the pressure roller 200 includes an increased diameter near the first and second ends 202, 204, defining locally increased pressures, as well as a respective reduction in diameter and pressure relatively farther from the first and second ends 202, 204. The increased diameter at the first and second ends 202, 204, and the increased local pressure applied by the pressure roller 200, resists the squeeze out of the adhesive 212, defining a pressure barrier at the first and second ends 202, 204. Such a pressure barrier maintains all or a relatively greater amount of the adhesive 212 between the pressure roller 200 and the component 208 and reduces or minimizes the amount of the adhesive 212 that is squeezed out from between the pressure roller 200 and the component 208, such as compared to a cylindrical roller. When applied to a non-uniform exterior surface 210, the shape of the pressure roller 200 can be complementary to the non-uniform exterior surface 210, while having a relatively greater diameter, or other shape, to achieve a similar pressure barrier at the first and second ends 202, 204, maintaining all or a relatively greater amount of adhesive 212 between the pressure roller 200 and the component 208, despite the non-uniformity of the exterior surface 210.

Reducing squeeze out of the adhesive 212 provides for a greater, improved, or increased bond between the strip of fiber tows 206 and the component 208, which results from greater consistency among the adhesive across the pressure roller 200. The resultant greater consistency among the strip of fiber tows 206 results in a decrease or reduction in local variations of the amount or concentration of the adhesive 212. Such a decrease or reduction in local variations also reduces the occurrence of thin spots, having relatively less amounts of the adhesive 212, reduces areas of excess adhesive 212, or heavy spots with relatively greater amount of the adhesive 212, or a combination thereof. A reduction in the amount of adhesive 212 that is squeezed out reduces the amount of adhesive 212 that is applied to or at the strip of fiber tows 206, reducing materials and waste. Additionally, the amount of finishing or machining required for the component 208, resultant of adhesive squeeze out or inconsistent adhesive application, can be reduced, further reducing materials, processing, and waste, while also reducing cost. In addition, the consistent application of the adhesive 212 provides for improved or increased consistency in the formation of the component 208, resulting in a reduction in post-processing and overall manufacturing losses, which otherwise occur with areas of relatively heavy or light adhesive.

Figure 6A:
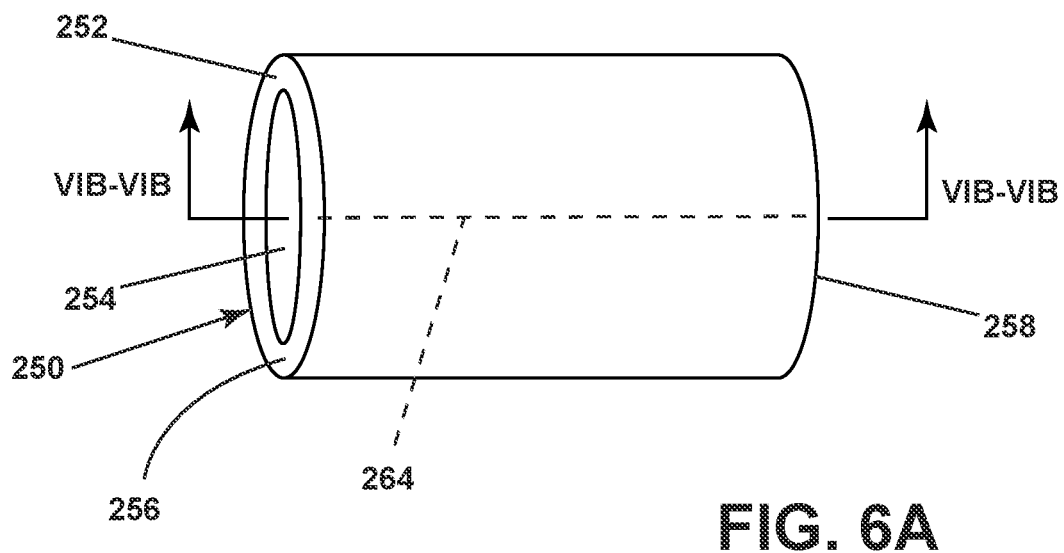
FIG. 6A is an isometric view of a pressure roller for use with an automated fiber placement assembly, including two materials having different material properties, in accordance with an exemplary aspect of the present disclosure.

FIG. 6A depicts an exemplary pressure roller 250 with a varied material configuration. The pressure roller 250 has an outer portion 252 and an inner portion 254 radially surrounded by the outer portion 252 and extending between a first end 256 and an opposing second end 258. While the outer and inner portions 252, 254 are visible at the first end 256, it is contemplated that the outer portion 252 may cover the inner portion 254 at the first and second ends 256, 258. The pressure roller 250 rotates about a rotational axis 264 during application of fiber tows to a component (e.g., fiber tows 152 and component 154 of FIG. 3), and the inner portion 254 can intersect the rotational axis 264. The varied material configuration can be defined by different materials for the outer portion 252 and the inner portion 254, varying in a direction radially outward from the rotational axis 264.

The outer portion 252 can include a first material, and the inner portion 254 can include a second material different than the first material, with each of the first material and the second material having their own material properties. In one example, the first material can have a first material property, such as a first hardness, a first elasticity, a first yield strength, or combination thereof, which can be different than a second material property as a second hardness, a second elasticity, a second yield strength, or combination thereof. In one non-limiting example, the outer portion 252 and the inner portion 254 can be made from the same materials, or similar materials, while having a different material property. Such a different material properties can be the result of differences in manufacturing processes, for example.

Figure 6B:
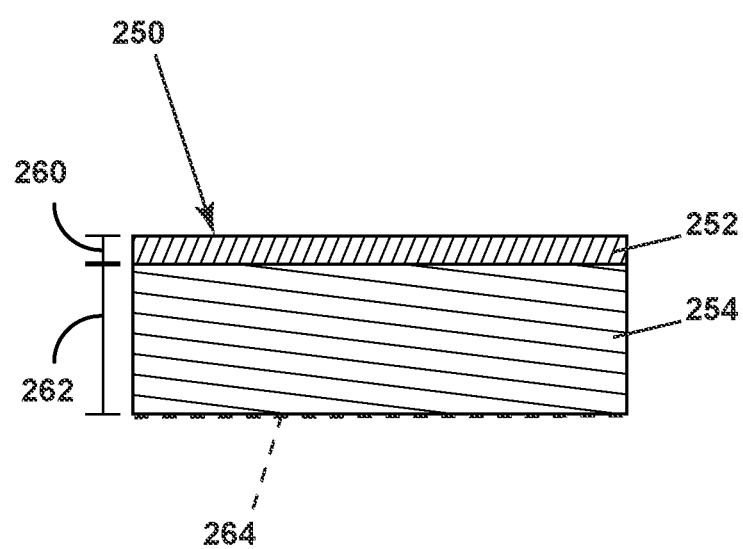
FIG. 6B is a sectional view of the pressure roller of FIG. 6A taken along section VIB-VIB, in accordance with an exemplary aspect of the present disclosure.

FIG. 6B shows a sectional view of FIG. 6A, taken along section VIB-VIB. As can be appreciated, a first thickness 260 for the outer portion 252 can be less than that of a second thickness 262 for the inner portion 254. In a non-limiting example, the first thickness 260 can be 10% of the total thickness (defined as a combination of the first and second thicknesses 260, 262) of the pressure roller 250, resulting in the second thickness 262 occupied by the inner portion 254 being 90% of the total thickness. In alternative non-limiting examples, the first thickness 260 of the outer portion 252 can vary among 10%-90% of the total thickness of the pressure roller 250, with the second thickness 262 of the inner portion 254 varying among 90%-10%, respectively.

FIGS. 7A-7M show exemplary cross-sectional views for additional exemplary pressure rollers, which include different portions or features to impart a consistent pressure across a non-uniform surface. FIGS. 7D-7L illustrate varied physical configurations, FIGS. 7A-7C, 7E-7F, 7H-7K, and 7M illustrate varied material configurations, and FIGS. 7E-7F, 7H, 7I-7K illustrate both varied physical and material configurations.

Figure 7A:
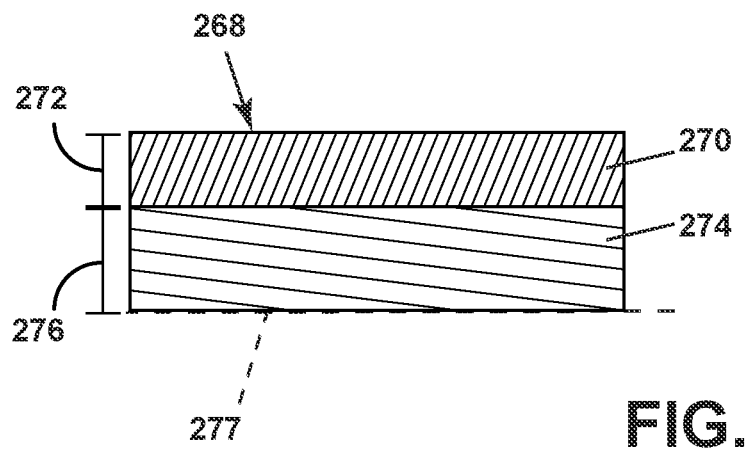
FIGS. 7A-7M illustrate section views of alternate exemplary pressure rollers suitable for use with an automated fiber placement assembly, in accordance with exemplary aspects of the present disclosure.

FIG. 7A shows an alternative sectional view for a pressure roller 268 where an outer portion 270 has a relatively greater thickness 272 than that of FIG. 6B, and where an inner portion 274 has a relatively lesser thickness 276, relative to a rotational axis 277. In a non-limiting example, it is contemplated that the thickness among the outer portion 270 and the inner portion 274 can be equal, or that the total mass among the outer portion 270 and the inner portion 274 is equal, while thicknesses are unequal. The outer portion 270 and the inner portion 274 can define the varied material configuration as having different materials, or where the outer portion 270 has different material properties than the inner portion 274. Such a variation is defined in a direction extending radially from the rotational axis 277.

Figure 7B:
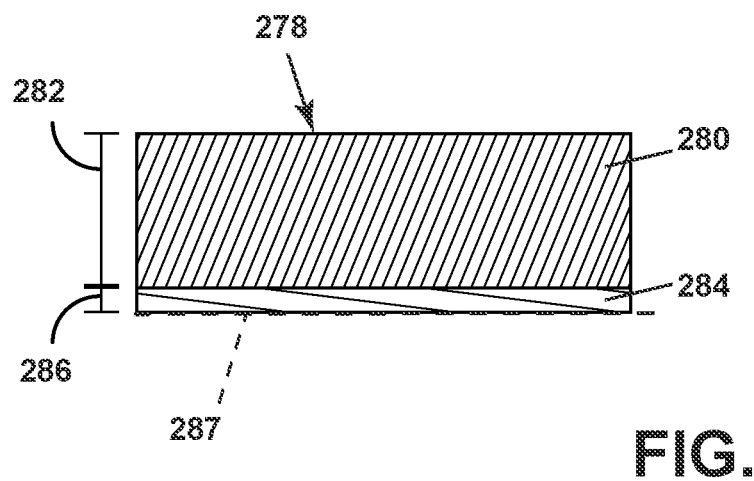

FIG. 7B shows another alternative sectional view for a pressure roller 288 where an outer portion 280 has a greater thickness 282 than a thickness 286 of an inner portion 284, relative to a rotational axis 287. In such an example, the inner portion 284 can have 10% of the total thickness, and the outer portion 280 can have 90% of the total thickness. Differences in the materials of the outer portion 280 and the inner portion 284 can define the varied material configuration.

Figure 7C:
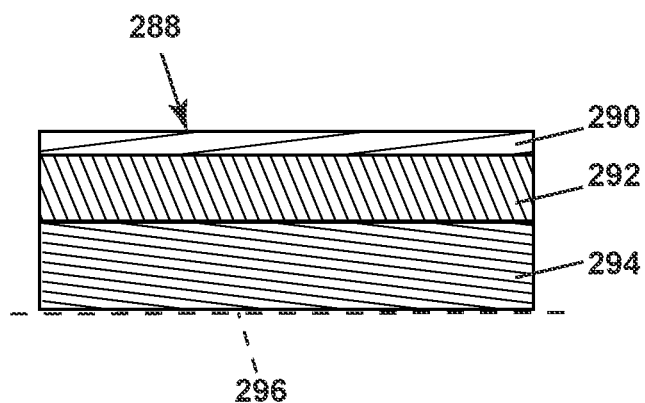

FIG. 7C shows yet another alternative sectional view of a pressure roller 288, including an outer portion 290, an intermediate portion 292, and an inner portion 294, each of which can include a different material, material property, or a combination thereof. It should be appreciated that any suitable number of portions is contemplated including one or more, or more than three. In a non-limiting example, it is contemplated that the material property for each of the outer, intermediate, and inner portions 290, 292, 294 can increase or decrease in a direction nearer or farther from a rotational axis 296, defining a gradient for material properties among the outer, intermediate, and inner portions 290, 292, 294 in either a radially inward or radially outward direction from the rotational axis 296. In a non-limiting example, the outer portion 290 can be an exterior coating, such as a coating to reduce adhesion in a non-limiting example. Differences in the materials among two or all of the outer portion 290, the intermediate portion 292, and the inner portion 294 can define the varied material configuration.

Additionally, the material properties may vary within one or more of the outer, intermediate, and inner portions 290, 292, 294 complementary to a non-uniform surface for the component. The material properties can vary the amount of deformation the pressure roller 288 experiences when applying a strip of fiber tows at a particular pressure. Such varying in deformation can provide for defining a varying pressure across the pressure roller 288 in order to complement the non-uniform surface of the component. In this way, a consistent pressure can be applied across the pressure roller 288 along a non-uniform surface, while permitting a cylindrical shape for the pressure roller 288.

Figure 7G:
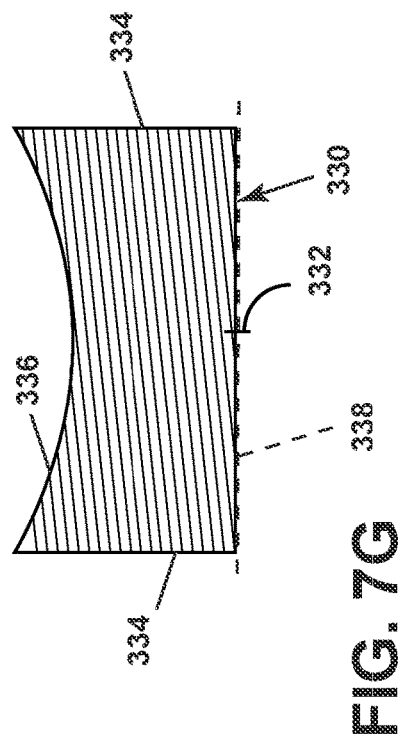
Figure 7H:
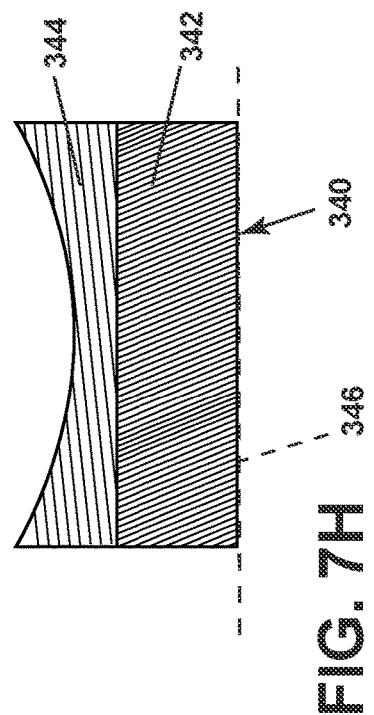
Figure 7D:
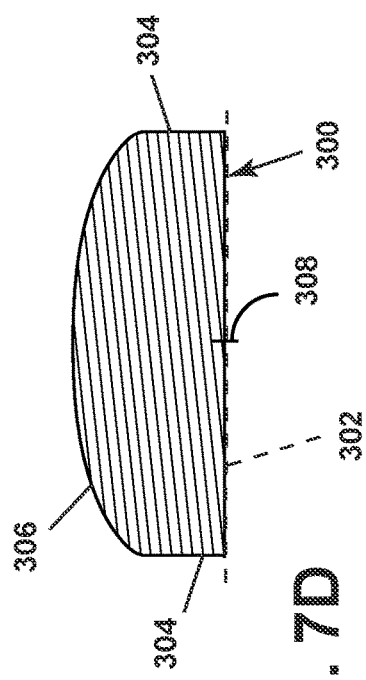

FIG. 7D shows a section of a pressure roller 300 extending from a rotational axis 302, having opposing ends 304, and a curved, convex, exterior surface 306. The exterior surface 306 can be curved such that the three-dimensional shape for the pressure roller 300 varies from cylindrical, with a diameter that increases in a direction away from either of the opposing ends 304 toward an axial center 308 and decreases from the axial center 308 in a direction toward the opposing ends 304. The pressure roller 300 can be made from a single material and can have consistent material properties across the pressure roller 300, while variable material properties are contemplated complementary to a non-uniform surface of the component in addition to the curved shape for the exterior surface 306. The convex exterior surface 306 can define a varied physical configuration for the pressure roller 300.

Figure 7E:
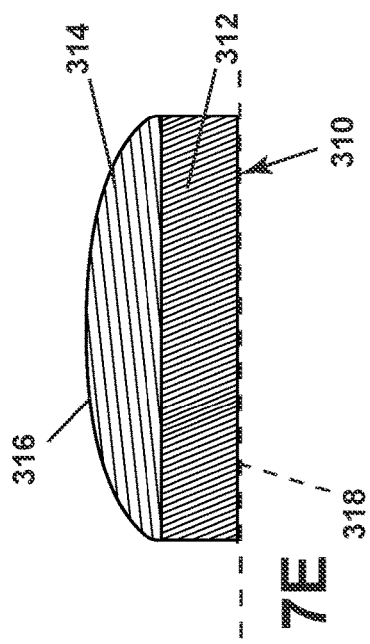

FIG. 7E shows a section of another exemplary pressure roller 310, having a shape similar to that of FIG. 7D, while having two different materials arranged as an inner portion 312 and an outer portion 314, rotatable about a rotational axis 318. The outer portion 314 includes an exterior surface 316 having a convex shape, complementary to a concave shape of a non-uniform surface for a component. In one non-limiting example, the inner portion 312 can have a first material property different than that of a second material property for the outer portion 314. For example, the outer portion 314 can have a greater elasticity or lesser hardness than that of the inner portion 312, permitting greater deformation of the outer portion 314 when applying the strip of fiber tows complementary to a non-uniform shape for the component. In another non-limiting example, a hardness or a yield strength for the inner portion 312 can be greater than a hardness or a yield strength for the outer portion 314, providing for relatively lesser deformation of the inner portion 312 than the outer portion 314. Such an arrangement can permit deformation of the exterior surface 316 complementary to the non-uniform shape, while the inner portion 312 resists excessive deformation, which may otherwise fail to complement the non-uniform surface in an even manner. While only two portions or materials are depicted, it should be appreciated that two or more portions are contemplated, with each portion having a different material property, while some portions having similar material properties is contemplated. The convex exterior surface 316 can defined a varied physical configuration for the pressure roller 310, while differences among the materials among the inner portion 312 and the outer portion 314 can define a varied material configuration.

Figure 7F:
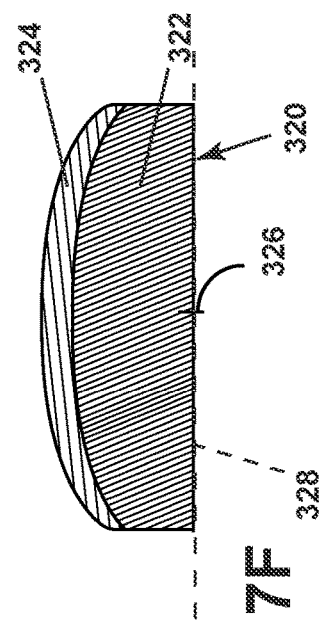

FIG. 7F shows a section of another exemplary pressure roller 320, having a shape similar to that of FIGS. 7D and 7E, and having an inner portion 322 and an outer portion 324 rotatable about a rotational axis 328. The outer portion 324 has a relatively lesser thickness than that of FIG. 7E, defined perpendicular to the rotational axis 328. A variable thickness for the outer portion 324 can define variable pressures across the pressure roller 320 by virtue of different materials or different material properties, without necessitating complementary shaping among the pressure roller 320 and a non-uniform surface of a component. In one example, the greatest thickness for the inner portion 322 and the outer portion 324 can be at an axial center 326 located at the center of the pressure roller 320 along the rotational axis 328. The convex exterior surface can define a varied physical configuration for the pressure roller 310, as well as among each of the inner portion 322 and the outer portion 324. Differences among the materials among the inner portion 322 and the outer portion 324 can define a varied material configuration.

FIG. 7G shows a section view of another exemplary pressure roller 330, having an axial center 332 located centrally along a rotational axis 338, opposing ends 334, and a curved, concave, exterior surface 336. The exterior surface 336 can be curved or concave, such that the three-dimensional shape for the pressure roller 330 varies from cylindrical, with a diameter that decreases further from the opposing ends 334 toward the axial center 332 and increases from the axial center 332 toward the opposing ends 304. The pressure roller 330 can be made from a single material and can have consistent material properties across the pressure roller 330, while variable material properties are contemplated complementary to a non-uniform surface of the component in addition to the curved shape of the exterior surface 336. In an additional, non-limiting example, different or multiple materials are contemplated, or materials having different material properties. The concave exterior surface 336 can defined a varied physical configuration for the pressure roller 330.

FIG. 7H shows a section view of another exemplary pressure roller 340 rotatable about a rotational axis 346 and having a shape similar to that of FIG. 7G, while having two different materials arranged as an inner portion 342 and an outer portion 344. The material for the inner portion 342 can have a different material property than that of the outer portion 344, such as a different hardness, different yield strength, different elasticity, or combination thereof. In a non-limiting example, one or both the hardness or the yield strength for the inner portion 342 can be greater than the hardness or the yield strength for the outer portion 344, permitting greater deformation of the outer portion 344 complementary to a non-uniform surface of a component. While only two portions or materials are depicted, it should be appreciated that two or more are contemplated, with each portion having different or similar material properties, shapes, sizes, thickness, geometries, or combinations thereof. The concave exterior surface can define a varied physical configuration for the pressure roller 340, the outer portion 344, or both. Differences among the materials among the inner portion 342 and the outer portion 344 can define a varied material configuration.

Figure 7I:
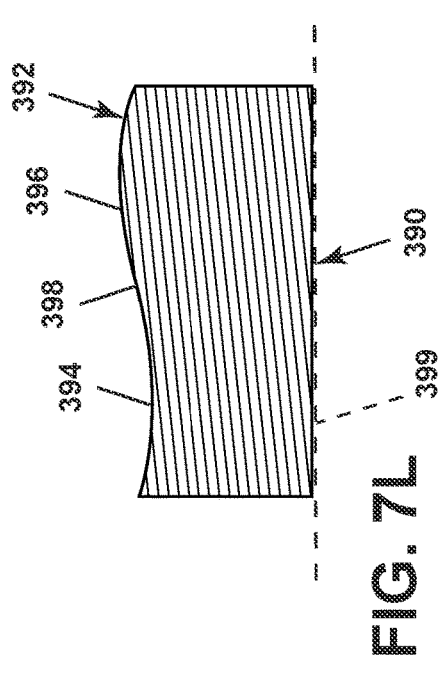

FIG. 7I shows a section view of another exemplary pressure roller 350 having an inner portion 352 and outer portion 354 rotatable about a rotational axis 358 and shaped substantially similar to that of FIGS. 7G and 7H. The outer portion 354 is shaped to have a consistent thickness, while having a concave exterior surface 356. It is contemplated that the thickness for the inner portion 352 can vary in a complementary manner to the exterior surface 356 to permit the consistent thickness for the outer portion 354 and the concave shape of the exterior surface 356. In this way, the inner portion 352 can be shaped complementary to a non-uniform surface, while permitting a layer capable of greater deformation between the strip of fiber tows being laid and the pressure roller 350 as the outer portion 354. Such an arrangement can provide for complementing the non-uniform surface, via the inner portion 352, while the outer portion 354 may deform to provide uniform pressure across the non-uniform surface. In this way, the outer portion 354 can provide a uniform pressure across a non-uniform surface, while the inner portion 352 is sized and shaped to define the exterior surface 356. For example, such an outer portion 354 can provide for up to 5% deviation from complementary between the inner portion 352 and the non-uniform surface. The concave exterior surface 356 can define a varied physical configuration for the pressure roller 350, the outer portion 354, the inner portion 352, or combinations thereof. Differences among the materials among the inner portion 352 and the outer portion 354 can define a varied material configuration.

Figure 7J:
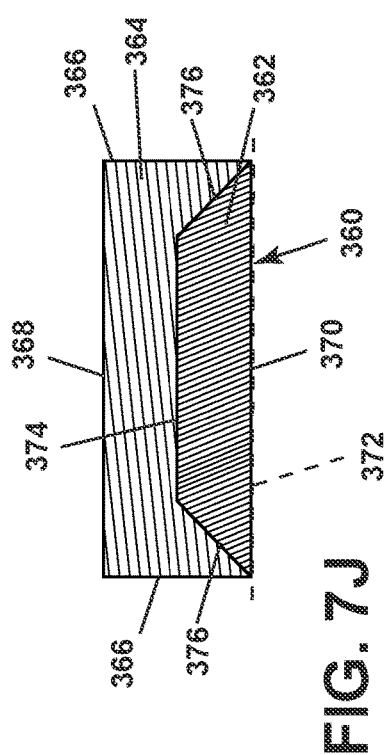

FIG. 7J shows a section view of another exemplary pressure roller 360 having an inner portion 362, an outer portion 364, rotatable about a rotational axis 372, extending between opposing ends 366, and having an exterior surface 368. The inner portion 362 has a substantially trapezoidal shape taken in cross section, having a long side 370 arranged along the rotational axis 372, a short side 374 positioned at the outer portion 364, and opposing edges 376 connecting the long side 370 to the short side 374 within the outer portion 364. The pressure roller 360 can be cylindrical, having a constant thickness and diameter between the opposing ends 366, where the thickness for the outer portion 364 can vary in a complementary manner to the trapezoidal shape of the inner portion 362 in order to maintain the constant thickness. The trapezoidal shape for the inner portion 362 can be shaped complementary to the non-uniform surface of the component, while the cylindrical shape of the pressure roller 360 resultant of the outer portion 364 can apply even pressure across the pressure roller 360 despite the non-uniform shape of the trapezoidal inner portion 362. While FIG. 7J shows a trapezoidal cross-sectional shape, additional non-limiting cross-sectional shapes can include square, rectangular, triangular, hexagonal, latticed, circular, oval, elliptical, curved, linear, curvilinear, non-defined, or combinations thereof. The shape of the inner portion 362 or the outer portion 364 can define a varied physical configuration for the pressure roller 360. Differences among the materials among the inner portion 362 and the outer portion 364 can define a varied material configuration.

Figure 7K:
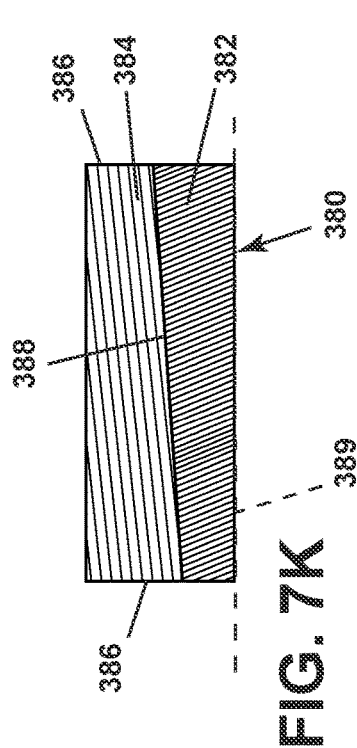

FIG. 7K shows a section view of another exemplary pressure roller 380 having an inner portion 382 and an outer portion 384 extending between opposing ends 386, and rotatable about a rotational axis 389. The thickness for the inner portion 382 can vary consistently in a direction defined along the rotational axis 389 between the opposing ends 386. The varying thickness for the inner portion defines a linear junction 388 between the inner portion 382 and the outer portion 384, where the linear junction 388 varies in distance from the rotational axis 389 between the opposing ends 386. The thickness for the inner portion 382 increases in a complementary manner to a decrease in thickness for the outer portion 384, and vice versa, in order to achieve the varying thicknesses. Therefore, a cylindrical pressure roller 380 is permitted, while providing a varying pressure between the opposing ends 386, as defined by the material properties of the inner portion 382 and the outer portion 384, or the differences between material properties thereof. The shape of the inner portion 382 or the outer portion 384 can define a varied physical configuration for the pressure roller 380. Differences among the materials among the inner portion 382 and the outer portion 384 can define a varied material configuration.

Figure 7L:
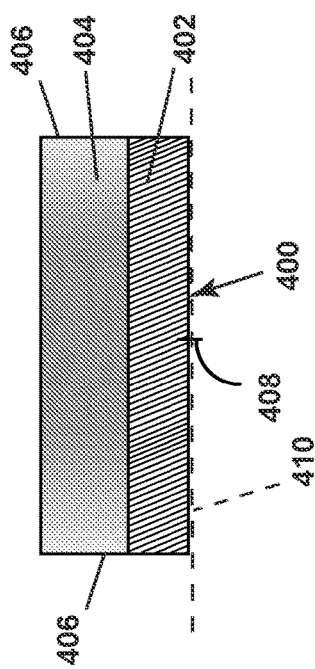

FIG. 7L shows a section view of another exemplary pressure roller 390, rotatable about a rotational axis 399, and having an exterior surface 392. The exterior surface 392 varies in a sinusoidal manner, having a concave portion 394 and a convex portion 396 joined at an inflection point 398. It should be appreciated that the exterior surface 392 for the pressure roller 390 can include any suitable shape complementary to the particular non-uniform surface. The pressure roller 390 can be made from a single material and can have consistent material properties across the pressure roller 390, while variable material properties are contemplated complementary to a non-uniform surface of the component in addition to the shape of the exterior surface 392. In one example, the pressure roller 390 can be defined as having a non-uniform radius (and diameter), which can be complementary to the non-uniform surface. The shape of the exterior surface 392 can define a varied physical configuration for the pressure roller 390.

Figure 7M:
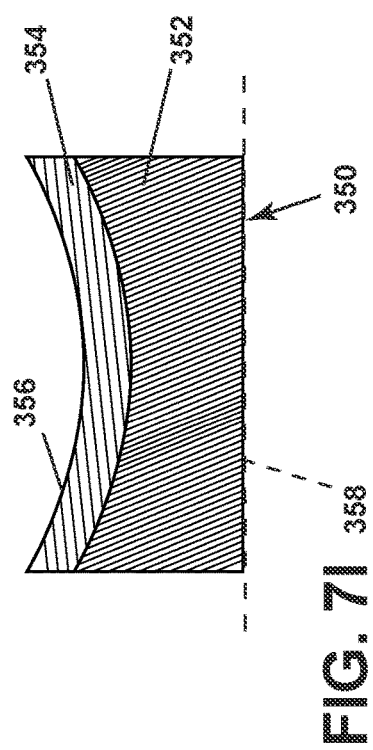

FIG. 7M shows a section view of another exemplary pressure roller 400 having an inner portion 402 and an outer portion 404 extending between opposing ends 406, and rotatable about a rotational axis 410. The inner portion 402 can be made of a material having a consistent material property across the entirety of the inner portion 402. The outer portion 404 can have a material with variable material properties along the pressure roller 400, such as a variable hardness, a variable yield strength, variable elasticity, or combination thereof. Such a variable material property varies in a consistent or constant manner in a direction extending between the opposing ends 406. More specifically, the hardness or yield strength for the outer portion 404 can increase extending from the opposing ends 406 toward an axial center 408, where the hardness or yield strength for the outer portion 404 is greatest at the axial center 408. In this way, a gradient can be defined for the material property for the outer portion 404 that increases nearer to the axial center 408, decreases nearer to the opposing ends 406. In alternative non-limiting examples, it is contemplated that the inner portion 402 can have a variable hardness or yield strength, or material property gradient, or both the inner portion 402 and the outer portion 404 can have a variable hardness, a variable yield strength, or variable material properties. In additional non-limiting examples, it is contemplated the material properties can vary in a non-consistent manner, such as having local areas of greater or lesser hardness or yield strength, or discrete regions with locally varied hardness or gradients thereof. The material property gradient, consistent or non-consistent, or the local areas or discrete regions defined by the variable material properties can be tailored to the non-uniform shape of the component, while permitting a cylindrical roller. Alternatively, non-cylindrical pressure rollers with variable material properties are contemplated. While the material property gradient as shown extends between the opposing ends 406, it is contemplated that the gradient varies in any suitable direction, or only partially within the pressure roller 400. In this way, variable material properties can permit the pressure roller 400 to apply greater or lesser local pressures complementary to the particular non-uniform surface of the component, without regard to shape of the pressure roller 400. The gradients, different local material properties, or both, can permit consistent application of pressure by the pressure roller 400 without a specific geometric complement to the non-uniform surface of the component. Differences among the materials among the inner portion 402 and the outer portion 404 can define a varied material configuration, as well as the gradient of the outer portion 404.

Considering FIGS. 7A-7M, it should be understood that a pressure roller described herein can include various geometric shapes, or various geometric shapes defined when the pressure roller is taken in cross section. Such shapes can include curvatures such as concave or convex, as well as non-curved shapes or curvilinear shapes, such as linear or geometric shapes, while combinations thereof are contemplated. As should be appreciated, the particular shape or geometry of the pressure roller, or the exterior surface thereof, can be complementary to or tailored to the shape of the non-uniform surface for the component. The particular material properties of the pressure roller, or portions thereof, can be used to locally reduce or increase the pressure provided by the pressure roller complementary to local variations in the shape of the non-uniform surface. A lesser local hardness or yield strength results in greater local deformation of the pressure roller, which can provide for greater compliance against variations in shape along the component. Similarly, a greater hardness or yield strength results in lesser deformation under pressure, which translates to an increased local pressure imparted from the pressure roller. Any suitable geometry or shape for the pressure roller is contemplated, or any suitable shape for one or more layers or portions thereof, forming a complete pressure roller. Additionally, it is contemplated that one or more features from FIGS. 7A-7M can be added, removed, or interchanged with other features to define additional embodiments, and that embodiments are not limited to only those examples as shown.

Figure 8A:
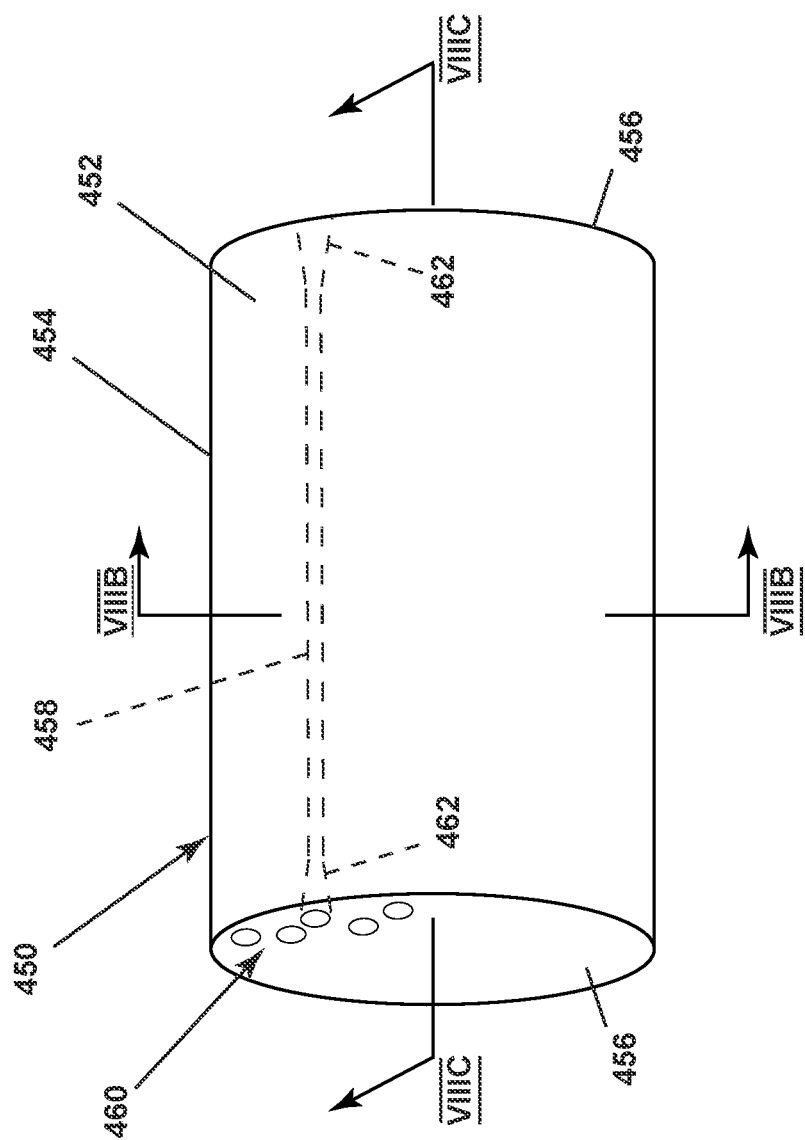
FIG. 8A is an isometric view of a pressure roller for use with an automated fiber placement assembly, including internal openings, in accordance with an exemplary aspect of the present disclosure.

Referring to FIG. 8A, an exemplary pressure roller 450 includes a body 452 having an exterior surface 454 extending between opposing ends 456. An aperture 458, shown in broken lines through the body 452, is part of a set of apertures 460 that similarly extend through the body 452 between the opposing ends 456. Each aperture of the set of apertures 460 can be cylindrical, with a widened end 462 at each of the opposing ends 456. In alternative examples, no widened end 462 is contemplated, or alternative non-cylindrical features are contemplated, at any position along each of the set of apertures 460. The set of apertures 460 can define a varied physical configuration for the pressure roller 450.

Figure 8B:
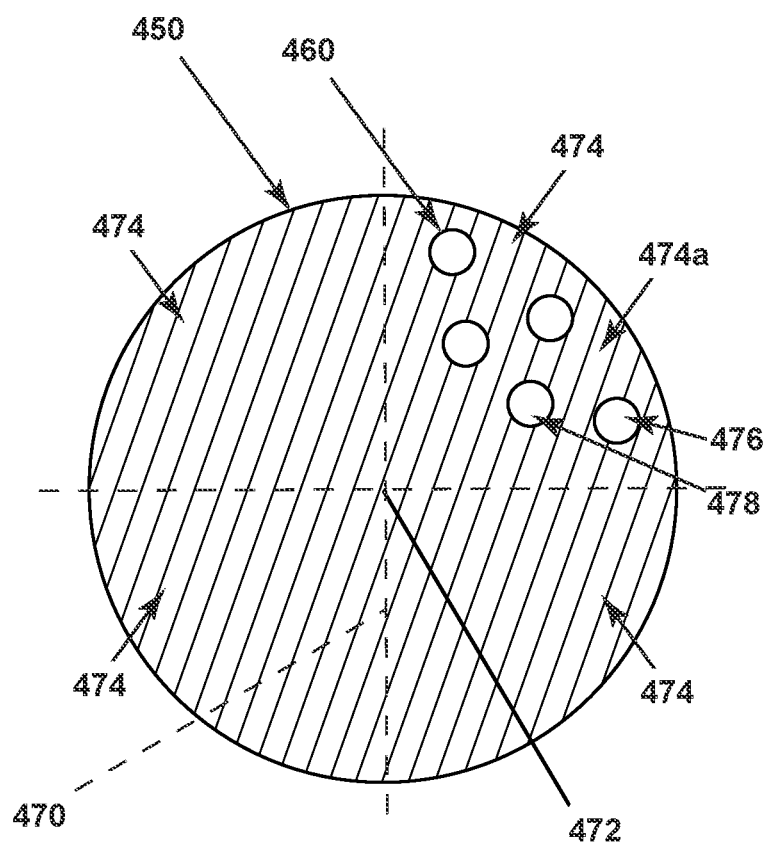
FIG. 8B is a sectional view of the pressure roller of FIG. 8A taken along section VIIIB-VIIIB, in accordance with an exemplary aspect of the present disclosure.

FIG. 8B shows a cross-sectional view of the pressure roller 450 of FIG. 8A, taken along section VIIIB-VIIIB. An exemplary cross 470, shown in broken line, is arranged at a center 472 of the pressure roller 450, and can be used to separate the pressure roller 450 into quadrants 474. It should be understood that the cross 470 is shown for reference only in visualizing the quadrants 474 and is not a physical feature of the pressure roller 450. The set of apertures 460 are arranged in a first quadrant 474a, while the remaining quadrants 474 contain no apertures. The set of apertures 460 can further be arranged into groups based on radial distance from the center 472 as a radially outer group 476 and a radially inner group 478, and each aperture of the set of apertures 460 among each of the radially outer and radially inner groups 476, 478, can have the same radial distance from the center 472 as the other set of apertures 460 within the common radially outer or radially inner group 476, 478.

In alternate, non-limiting examples, the set of apertures 460 can be arranged in more than one quadrant 474 or can extend in a circular arrangement or pattern among all quadrants 474, such as having a common radius. In another non-limiting example, each quadrant 474 can have a different arrangement of apertures 460, or two or more quadrants 474 can have the same arrangement, while differing from another quadrant 474. While only radially inner and radially outer groups 476, 478 are shown, any number of groups is contemplated, with each group having one or more apertures 460, and with each group having a different radius defined from the center 472 for each aperture 460 within each group. It should be appreciated that any organization or arrangement of apertures 460 is contemplated, with any arrangement also being limited to one or more quadrants 474, or among all quadrants 474. Additionally, delineation of the pressure roller 450 need not be in quadrants 474, but can be in any suitable fraction, such as halves, thirds, sixths, or eighths, while uneven or discrete delineations are also contemplated as may be useful based on the non-uniform surface of the component.

Figure 8C:
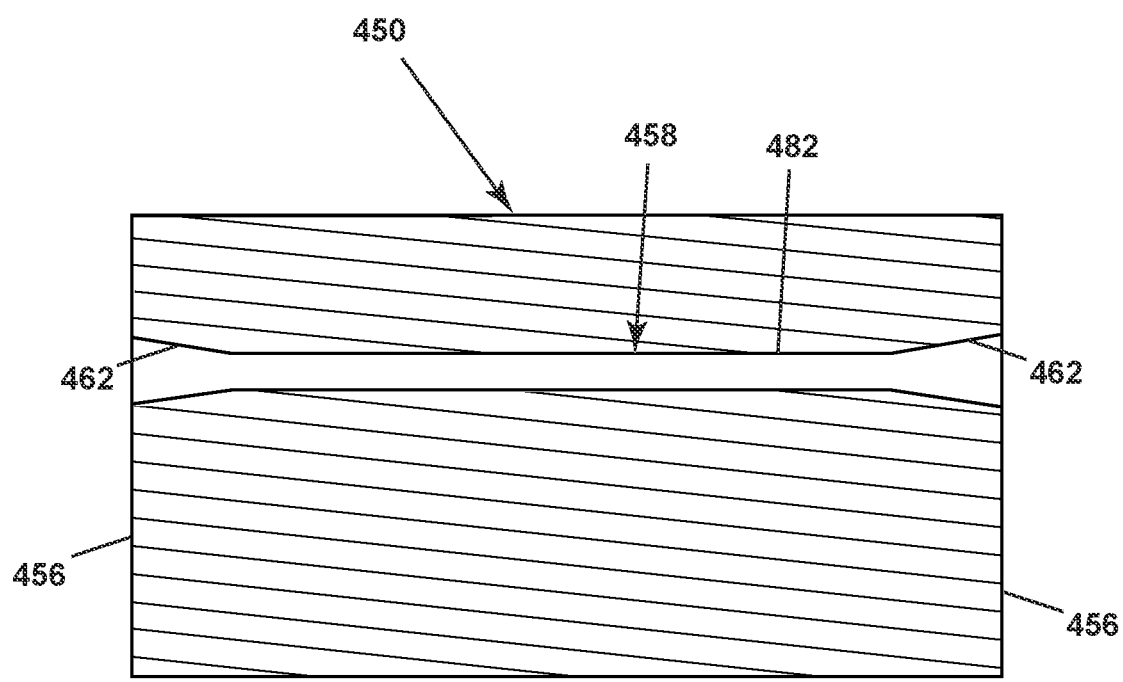
FIG. 8C is a sectional view of the pressure roller of FIG. 8A taken along section VIIIC-VIIIC, including an aperture within the pressure roller, in accordance with an exemplary aspect of the present disclosure.

FIG. 8C shows a cross-sectional view of the pressure roller 450 of FIG. 8A, taken along section VIIIC-VIIIC and through the aperture 458. It should be appreciated that the section only shows the single aperture 458, similar to that of FIG. 8A, for clarity of understanding, and that the remaining apertures of the set of apertures 460 (FIG. 8A) are not shown in section VIIIC-VIIIC. The aperture 458 extends between the opposing ends 456. The aperture 458 includes the widened ends 462 at each of the opposing ends 456, where the diameter for the aperture 458 increases near the opposing ends 456 to define the widened ends 462 and includes a constant diameter portion 482 extending between the widened ends 462. In additional non-limiting examples, any geometry for the aperture 458, or any aperture of the set of apertures 460 (FIG. 8A) is contemplated, including but not limited to cylindrical, annular, oval, circular, elliptical, linear, geometric, stepped, curvilinear, or combinations thereof. In further non-limiting examples, the apertures 458 can have any cross-sectional geometry, including linear, curved, angled, curvilinear, stepped, or combinations thereof.

Referring to FIGS. 8A-8C, it should be appreciated that the pressure applied by the pressure roller 450 can vary based upon the arrangement and shape of the apertures 458, as well as the rotational position of the pressure roller 450. More specifically, as the pressure roller 450 rotates, different quadrants 474 contact the strip of fiber tows, which applies a different pressure based on the particular quadrant 474 in contact with the strip of fiber tows 152 (FIG. 3). As should be understood, a decreased pressure is applied when the first quadrant 474a, or any quadrant 474 containing one or more apertures 460, contacts the strip of fiber tows 152 (FIG. 3), as compared to that of a quadrant 474 with lesser or no apertures 460. In this way, a pressure curve can be defined by the rotation of the pressure roller 450, where the applied pressure varies by pressure roller rotational position and the relative arrangement of the set of apertures 460 within the pressure roller 450. The size, shape, location, number, or orientation of the set of apertures 458 can further define local pressures along the pressure curve, but in a direction between the opposing ends 456, perpendicular to the direction of rotation of the pressure roller 450. In this way, the pressure applied by the pressure roller 450 can be determined based upon an organization of interior sets of apertures 460 and can be complementary to the non-uniform shape of the component, such that local application pressures increase or decrease by way of the set of apertures 460. Specifically, as the component defines an increased local thickness resultant of a non-uniform surface, the arrangement of the set of apertures 460 can be complementary to the non-uniform surface to define a reduced pressure or an increase in compliance complementary to the non-uniform surface. Similarly, lesser or no apertures 460 can be utilized within the pressure roller 450 to define an increased pressure at areas of the non-uniform surface to be complementary with relatively decreased local thickness.

Figure 9:
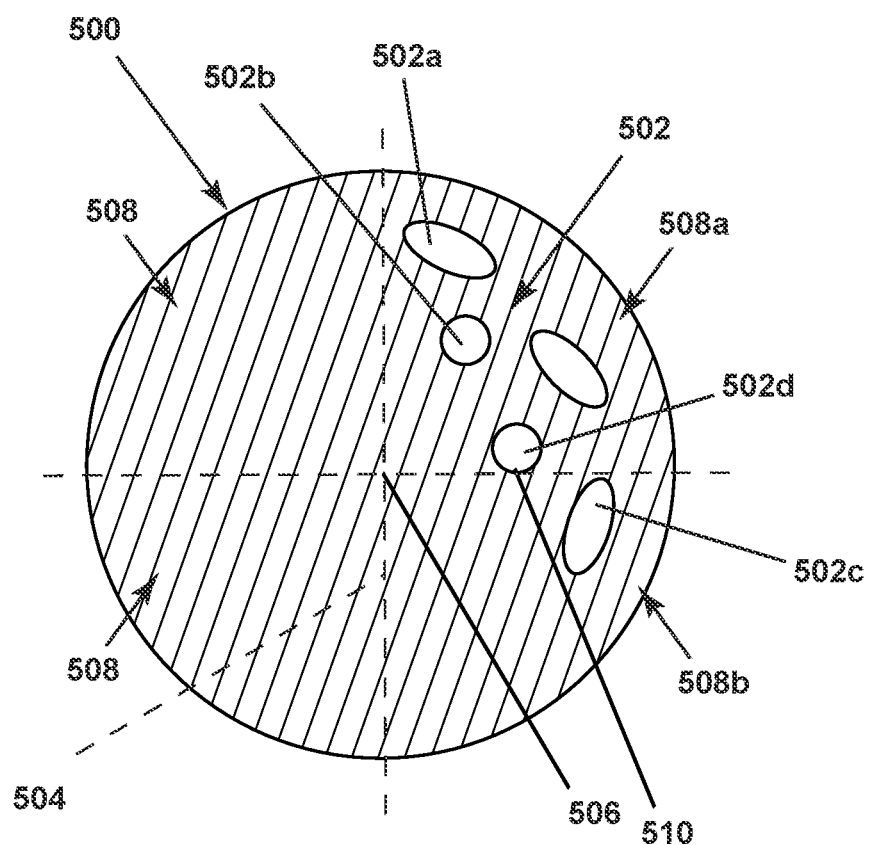
FIG. 9 is a sectional view of an alternate pressure roller, illustrating an alternate arrangement of apertures within the pressure roller, in accordance with an exemplary aspect of the present disclosure.

Referring to FIG. 9, a cross section of an alternate pressure roller 500, similar to that of FIG. 8B, includes a set of apertures 502 in an uneven arrangement, and having some apertures 502a of the set of apertures 502 having an elliptical cross-sectional shape, and other apertures 502b of the set of apertures 502 having a circular cross-sectional shape. Similar to that of FIG. 8B, an exemplary cross 504 is arranged at a rotational center of the pressure roller 500, shown as a center 506. The cross 504, shown in broken line, can be used to appreciate separation of the pressure roller 500 into a set of quadrants 508. The set of apertures 502 can define a varied physical configuration for the pressure roller 500.

A majority of the set of apertures 502 are arranged in a first quadrant 508a, while one aperture 502c is arranged in a second quadrant 508b. Another aperture 502d is arranged at a junction 510 between the first quadrant 508a and the second quadrant 508b. In this way, it should be appreciated that the arrangement of the set of apertures 502 need not be limited to one or more quadrants, or patterned among the quadrants, but rather can be arranged in a non-patterned fashion, still applying pressures tailored to a specific shape for a component.

Figure 10:
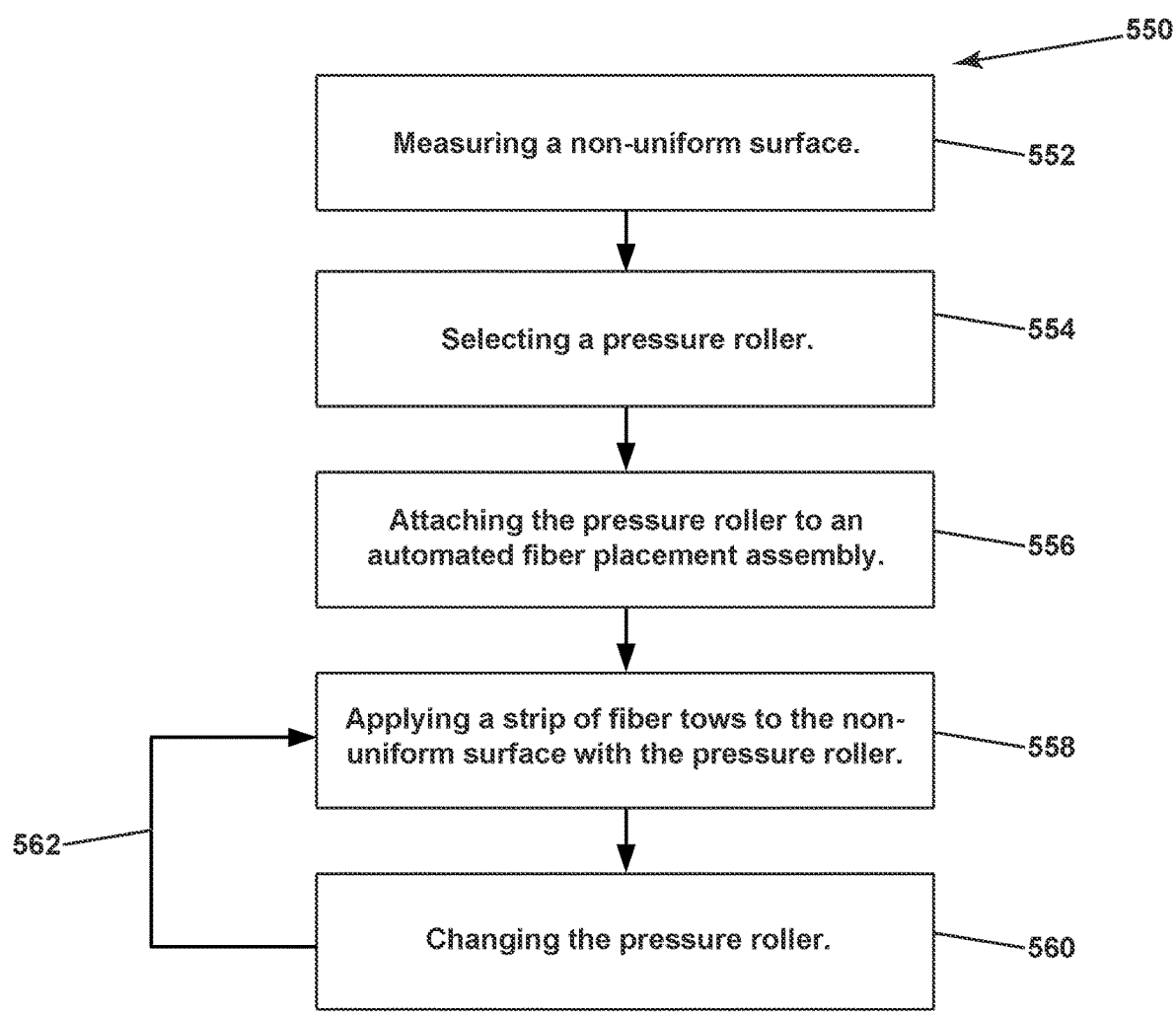
FIG. 10 is a flow chart depicting a method of forming a component with an automated fiber placement, with the component having a substrate with a non-uniform surface, in accordance with an exemplary aspect of the present disclosure.

FIG. 10 shows a flow chart depicting a method 550 of forming a component, such as the component 154, 208 of FIGS. 3-5, having a non-uniform surface, such as the non-uniform surface 166 of FIGS. 3-4, with an automated fiber placement assembly 150, such as that of FIG. 3. The component 154, 208 can be a substrate, for example, such as the substrate 158 of FIG. 3, for example. At 552, the method 550 can include measuring the non-uniform surface 166, such as with one or more sensors. For example, the non-uniform surface 166 can be measured with a coordinate measuring machine (CMM) such as a laser CMM in order to determine the geometry of non-uniform surface 166. Alternatively, measurement of the non-uniform surface 166 can be derived from geometry of the component 154, 208, or the substrate 158 or mandrel upon which the component 154, 208 is being formed, without requiring direct measurement of the non-uniform surface 166 itself.

At 554, the method 550 can include selecting a pressure roller, such as the pressure rollers 160, 200, 250, 268, 278, 288, 300, 310, 320, 330, 340, 350, 360, 380, 390, 400, 450, 500 of FIGS. 3-9. The selected pressure roller can have either or both of a varied physical configuration or a varied material configuration. The selected pressure roller includes the varied physical configuration or the varied material configuration complementary to the non-uniform surface 166 in order to provide an even or uniform pressure across the non-uniform surface 166. Where multiple pressure rollers are needed to cover the non-uniform surface 166, selecting the pressure roller can include selecting multiple pressure rollers as may be needed to cover the non-uniform surface 166.

At 556, the method 550 can include attaching the pressure roller to the automated fiber placement assembly 150 (FIG. 3). At 558, the method 550 can include applying a strip of fiber tows, such as the strip of fiber tows 152, 206 of FIGS. 3 and 5 to the substrate 158 (FIG. 3) along the non-uniform surface 166 (FIG. 3) with the pressure roller. The pressure roller can apply even pressure across the strip of fiber tows 152, 206 complementary to the non-uniform surface 166. In one example, the pressure can vary by no more than 5% across the pressure roller along the non-uniform surface.

Where multiple pressure rollers are utilized, the method 550, at 560, can further include changing the pressure roller from a first pressure roller to a different second pressure roller complementary to a different portion of the non-uniform surface 166, and attaching the second pressure roller to the automated fiber placement assembly 150. After changing the pressure roller, the method 550, at 562, can return to apply another strip of fiber tows at 558, and this process loop can be repeated until formation of the component is completed.

In an alternative example, the method 550 can be specific to the formation of a particular component, such as the composite airfoil 100 of FIG. 2. Where the method 550 is specific to a particular component, there may be no need to measure the non-uniform surface at 552, or select a particular pressure roller at 554, as the particular component may be pre-measured and have a particular pressure roller, or set thereof, configured for formation of the particular component. It should be understood, therefore, that the method 550 can comprise 556, 558, and 560, including attaching the pressure roller to the automated fiber placement assembly 150, applying the strip of fiber tows 152, 206, and changing the pressure roller in order to apply additional strips of fiber tows 152, 206 to additional areas of the non-uniform surface 166. Furthermore, it is contemplated where one or more pressure rollers are pre-attached to the automated fiber placement assembly 150, such that the method 550 need not include attachment of the pressure roller to the automated fiber placement assembly 150 at 556. Additionally, the method 550 can include, at 556, where attaching the pressure roller comprises attaching a set of multiple pressure rollers, without the need to replace individual pressure rollers, but rather select another attached pressure roller for application of the strip of fiber tows 152, 206. In such an example, changing the pressure roller, at 560, can include selecting a different pressure roller from a set of pressure rollers that have been attached to the automated fiber placement assembly 150.

The method 550 as described herein provides for creating a component on a substrate with a non-uniform surface and improving manufacture of such a component by the application of even pressure across the non-uniform surface with a pressure roller shaped complementary to the non-uniform surface. Applying a strip of fiber tows to a non-uniform surface with the pressure roller shaped complementary to the non-uniform surface provides for improved application of the strip of fiber tows, as improved adhesion and bonding, which results in greater consistency among the materials forming the component. Such greater consistency decreases manufacture costs and required finishing and post-production as compared to general application of materials to form a component without consideration of the non-uniform surface of the component.

Benefits can be realized with utilizing a roller for an automated fiber placement assembly with the roller being shaped complementary to the component d, and particularly, when the component includes a non-uniform surface. A pressure roller complementary to the non-uniform surface results in greater uniformity of pressure applied to the strip of fiber tows being placed on the component, compared to a pressure roller that is not tailored to the component. Greater uniformity of pressure can provide for greater or improved adhesion among the strip of fiber tows and the underlying component, as well as a reduction in squeeze out of adhesives. The pressure roller can include various materials, material properties, shapes, apertures, geometries, or other arrangements in order to define a variable pressure across the pressure roller shaped complementary to the shape of the non-uniform surface of the component. Improved pressure application improves overall manufacture, reducing finishing and related costs, as well as required maintenance, and can increase component lifetime.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

An automated fiber placement assembly for forming a component by the application of a strip of fiber tows, the automated fiber placement assembly comprising: a substrate comprising a non-uniform surface; a pressure roller for applying the strip of fiber tows to the substrate, the pressure roller including an exterior surface, defining a rotational axis, and extending between a first end and an opposing second end; wherein the exterior surface of the pressure roller is complementary to the non-uniform surface of the substrate.

The automated fiber placement assembly of any preceding clause, wherein the exterior surface is non-cylindrical.

The automated fiber placement assembly of any preceding clause, wherein at least a portion of the exterior surface is concave or convex.

The automated fiber placement assembly of any preceding clause, wherein pressure roller includes a variable diameter extending between the first end and the second end to be complementary to the exterior surface.

The automated fiber placement assembly of any preceding clause, wherein the variable diameter for the pressure roller comprises a greater diameter at the first end and the second end than that of the pressure roller spaced from the first end and the second end.

The automated fiber placement assembly of any preceding clause, wherein the greater diameter at the first end and the second end reduces squeeze out of adhesive for bonding the strip of fiber tows to the substrate.

The automated fiber placement assembly of any preceding clause, wherein the variable diameter varies consistently between the first end and the second end.

The automated fiber placement assembly of any preceding clause, wherein the pressure roller further comprises an inner portion and an outer portion.

The automated fiber placement assembly of any preceding clause, wherein the exterior surface of the outer portion is non-cylindrical, and the inner portion is cylindrical.

The automated fiber placement assembly of any preceding clause, wherein the roller has a non-uniform radius that is complementary to the non-uniform surface.

The automated fiber placement assembly of any preceding clause, wherein the exterior surface is one of circular, elliptical, rounded, curved, linear, curvilinear, concave, convex, stepped, sinusoidal, or a combination thereof.

The automated fiber placement assembly of any preceding clause, wherein the inner portion includes a first material property defining a first hardness or a first yield strength, and the outer portion includes a second material property defining a second hardness or a second yield strength, and wherein the first hardness or the first yield strength for the first material property is greater than the second hardness or the second yield strength for the second material property.

An automated fiber placement assembly for forming a component by applying a strip of fiber tows, the automated fiber placement assembly comprising: a substrate having a non-uniform surface; and a pressure roller extending between a first end and an opposing second end and defining a rotational axis, the pressure roller including an inner portion and an outer portion exterior of the inner portion, with the outer portion defining a cylindrical exterior surface; wherein at least one of the inner portion or the outer portion is complementary to the non-uniform surface to provide even pressure to the non-uniform surface across the pressure roller from the first end to the second end.

The automated fiber placement assembly of any preceding clause, wherein the even pressure varies by less than 5% across the exterior surface.

The automated fiber placement assembly of claim 10, wherein one of the inner portion or the outer portion has a material property complementary to the non-uniform surface.

The automated fiber placement assembly of any preceding clause, wherein the material property includes a variable hardness or a variable yield strength across the pressure roller complementary to the non-uniform surface.

The automated fiber placement assembly of any preceding clause, wherein the material property includes the variable hardness, and wherein the variable hardness defines a hardness gradient between the first end and the second end.

The automated fiber placement assembly of any preceding clause, wherein at least one of the first portion or the second portion includes a variable diameter extending at least partially between the first end and the second end.

The automated fiber placement assembly of any preceding clause, wherein one of the inner portion or the outer portion comprises 10% of a thickness of the pressure roller, and the other of the inner portion or the outer portion comprises 90% of the thickness of the pressure roller.

The automated fiber placement assembly of any preceding clause, wherein the pressure roller further comprises an intermediate portion between the inner portion and the outer portion, and wherein the intermediate portion includes one of a material property or a variable diameter complementary to the non-uniform surface.

The automated fiber placement assembly of any preceding clause, wherein the inner portion is cylindrical, and the outer portion includes a concave exterior surface.

The automated fiber placement assembly of any preceding clause, wherein the outer portion includes a constant thickness defined extending between the first end and the second end.

The automated fiber placement assembly of any preceding clause, wherein the inner portion includes a constant thickness defined extending between the first end and the second end.

The automated fiber placement assembly of any preceding clause, wherein the inner portion and the outer portion include a variable thickness defined extending between the first end and the second end.

The automated fiber placement assembly of any preceding clause, wherein one of the inner portion or the outer portion includes a cross-sectional profile that is trapezoidal.

The automated fiber placement assembly of any preceding clause, wherein one of the inner portion or the outer portion includes a cross-sectional profile that is one of squared, circular, rectangular, trapezoidal, hexagonal, oval, elliptical, curved, linear, curvilinear, or combinations thereof.

A pressure roller for an automated fiber placement assembly for forming a component on a substrate by the application of a strip of fiber tows, with the substrate having a non-uniform surface, the pressure roller comprising: a body comprising an exterior surface, defining a rotational axis, and extending between a first end and an opposing second end; and an aperture extending through the body at least partially between the first end and the second end; wherein the aperture is arranged within the body to provide a uniform pressure across the exterior surface complementary to the non-uniform surface of the substrate.

The pressure roller of any preceding clause, wherein the body is cylindrical.

The pressure roller of any preceding clause, wherein the aperture extends fully between the first end and the second end.

The pressure roller of any preceding clause, wherein at least a portion of the aperture includes a variable diameter defined in a direction extending between the first end and the second end.

The pressure roller of any preceding clause, wherein at least a portion of the aperture includes a constant diameter defined in the direction extending between the first end and the second end.

The pressure roller of any preceding clause, wherein the pressure roller is separable into a set of quadrants, and the at least one aperture is arranged within one quadrant of the set of quadrants.

The pressure roller of any preceding clause, wherein the aperture is part of a set of apertures, and wherein the set of apertures are arranged into a radially outer group and a radially inner group.

The pressure roller of any preceding clause, further comprising a second aperture, and wherein the aperture and the second aperture are spaced at different radial distances from the rotational axis.

The pressure roller of any preceding clause wherein the aperture and the second aperture have different shapes.

The pressure roller of any preceding clause wherein the pressure roller is interchangeable.

A method of forming a component with an automated fiber placement assembly, the component including a substrate having a non-uniform surface, the method comprising: applying a strip of fiber tows to the substrate with a pressure roller; wherein the pressure roller is shaped complementary to the non-uniform surface to apply an even pressure to the non-uniform surface across the pressure roller.

The method of any preceding clause, further comprising measuring the non-uniform surface.

The method of any preceding clause, further comprising selecting the pressure roller shaped complementary to the measured non-uniform surface.

The method of any preceding clause, further comprising attaching the selected pressure roller to the automated fiber placement assembly The method of any preceding clause, further comprising changing the pressure roller from a first pressure roller to a second pressure roller.

The method of any preceding clause, wherein the first pressure roller is shaped complementary to a first portion of the non-uniform surface, and wherein the second pressure roller is shaped complementary to a second portion of the non-uniform surface different than the first portion.

The method of any preceding clause, wherein the first portion of the non-uniform surface comprises a different surface than the second portion of the non-uniform surface.

The method of any preceding clause, wherein the pressure roller is shaped complementary to the non-uniform surface by one or more of a shape of the pressure roller defined complementary to the non-uniform surface, a diameter of the pressure roller defined complementary to the non-uniform surface, or a material property of the pressure roller defined complementary to the non-uniform surface.

An automated fiber placement assembly for forming a component by the application of a strip of fiber tows, the automated fiber placement assembly comprising: a substrate comprising a non-uniform surface; and a pressure roller extending axially between a first end and an opposing second end, and having a body with an exterior surface for applying pressure to the strip of fiber tows against the non-uniform surface of the substrate when the pressure roller is rotated about a rotational axis; wherein the pressure roller has a design configuration that is a varied physical configuration, a varied material property configuration, or both, and wherein the design configuration enables the pressure roller to apply the pressure uniformly to the strip of fiber tows in a manner complementary to the non-uniform surface.

The automated fiber placement assembly of any preceding clause, wherein the design configuration is a varied physical configuration in which the exterior surface is shaped complementary to a shape of the non-uniform surface.

The automated fiber placement assembly of any preceding clause, wherein at least a portion of the exterior surface is concave or convex.

The automated fiber placement assembly of any preceding clause, the pressure roller comprises a greater diameter at the first end and the second end than that of the pressure roller spaced from the first end and the second end.

The automated fiber placement assembly of any preceding clause, wherein the body further comprises an inner portion and an outer portion exterior of the inner portion and defining the exterior surface.

The automated fiber placement assembly of any preceding clause, wherein the exterior surface is cylindrical.

The automated fiber placement assembly of any preceding clause, wherein the variable diameter varies consistently between the first end and the second end.

The automated fiber placement assembly of any preceding clause, wherein the design configuration is both the varied physical configuration and a varied material property configuration in which a material property of the body varies axially, radially, or both axially and radially for the varied material property configuration.

The automated fiber placement assembly of any preceding clause, wherein the body further includes an inner portion, and an outer portion exterior of the inner portion and defining the exterior surface, wherein the inner portion has a first material property and the outer portion has a second material property different than the first material property.

The automated fiber placement assembly of any preceding clause, wherein the exterior surface is cylindrical.

The automated fiber placement assembly of any preceding clause, wherein the material property is one or more of a hardness or a yield strength.

The automated fiber placement assembly of any preceding clause, wherein the material property includes the hardness defining a hardness gradient in a direction extending between the first end and the second end.

The automated fiber placement assembly of any preceding clause, wherein the pressure roller further comprises an inner portion and an outer portion, wherein at least one of the inner portion or the outer portion includes the varied material configuration.

The automated fiber placement assembly of any preceding clause, wherein at least one of the inner portion or the outer portion is non-cylindrical.

The automated fiber placement assembly of any preceding clause, wherein the pressure roller further comprises an intermediate portion between an inner portion and an outer portion, and wherein at least one of the inner portion, the outer portion, or the intermediate portion includes the varied material configuration.

The automated fiber placement assembly of any preceding clause, wherein the design configuration is a varied physical configuration wherein the pressure roller comprises one or more apertures extending axially through the body at least partially between the first end and the second end.

The automated fiber placement assembly of any preceding clause, wherein the aperture extends fully between the first end and the second end.

The automated fiber placement assembly of any preceding clause, wherein at least a portion of the aperture includes a variable diameter defined in a direction extending between the first end and the second end.

The automated fiber placement assembly of any preceding clause, wherein at least a portion of the aperture includes a constant diameter defined in the direction extending between the first end and the second end.

The automated fiber placement assembly of any preceding clause, wherein the pressure roller is separable into a set of quadrants, and the aperture is arranged within one quadrant of the set of quadrants.

The automated fiber placement assembly of any preceding clause, wherein the design configuration is a varied material configuration in which a material property of the body varies axially, radially, or both axially and radially in a manner complementary to the non-uniform surface.

The automated fiber placement assembly of any preceding clause, wherein the body further includes an inner portion and an outer portion exterior of the inner portion and defining the exterior surface, wherein the inner portion has a first material property and the outer portion has a second material property different than the first material property.

The automated fiber placement assembly of any preceding clause, wherein the outer portion defines the exterior surface of the pressure roller, and wherein the exterior surface is cylindrical.

What is claimed is:

1. An automated fiber placement assembly for forming a component by application of a strip of fiber tows, the automated fiber placement assembly comprising:
    a substrate comprising a non-uniform surface; and
    a pressure roller extending axially between a first end and an opposing second end, and having a body with an exterior surface for applying pressure to the strip of fiber tows against the non-uniform surface of the substrate when the pressure roller is rotated about a rotational axis;
    wherein the pressure roller has a design configuration that is a varied physical configuration, a varied material property configuration, or both, and wherein the design configuration enables the pressure roller to apply the pressure uniformly to the strip of fiber tows in a manner complementary to the non-uniform surface a coating provided on the non-uniform surface;

wherein the design configuration includes at least an inner portion and an outer portion exterior of the inner portion and defining the exterior surface; and wherein at least one of the inner portion and the outer portion comprises a variable diameter complementary to the non-uniform surface.

2. The automated fiber placement assembly of claim 1, wherein the design configuration is a varied physical configuration in which the exterior surface is shaped complementary to a shape of the non-uniform surface.

3. The automated fiber placement assembly of claim 2, wherein at least a portion of the exterior surface is concave or convex.

4. The automated fiber placement assembly of claim 2, the pressure roller comprises a greater diameter at the first end and the second end than that of the pressure roller spaced from the first end and the second end.

5. The automated fiber placement assembly of claim 2, wherein the design configuration is both the varied physical configuration and a varied material property configuration in which a material property of the body varies axially, radially, or both axially and radially for the varied material property configuration in a manner complementary to the non-uniform surface.

6. The automated fiber placement assembly of claim 5, wherein the material property is one or more of a hardness or a yield strength.

7. The automated fiber placement assembly of claim 6, wherein the material property includes the hardness defining a hardness gradient in a direction extending between the first end and the second end.

8. The automated fiber placement assembly of claim 5, wherein the pressure roller further comprises an inner portion and an outer portion, wherein at least one of the inner portion or the outer portion includes the varied material configuration.

9. The automated fiber placement assembly of claim 5, wherein the pressure roller further comprises an intermediate portion between an inner portion and an outer portion, and wherein at least one of the inner portion, the outer portion, or the intermediate portion includes the varied material configuration.

10. The automated fiber placement assembly of claim 1, wherein the variable diameter varies consistently between the first end and the second end.

11. An automated fiber placement assembly for forming a component by application of a strip of fiber tows, the automated fiber placement assembly comprising:

a substrate comprising a non-uniform surface; and a pressure roller extending axially between a first end and an opposing second end, and having a body with an exterior surface for applying pressure to the strip of fiber tows against the non-uniform surface of the substrate when the pressure roller is rotated about a rotational axis;

wherein the pressure roller has a design configuration that is a varied physical configuration, a varied material property configuration, or both, and wherein the design configuration enables the pressure roller to apply the pressure uniformly to the strip of fiber tows in a manner complementary to the non-uniform surface; and wherein the design configuration is a varied physical configuration wherein the pressure roller comprises one or more apertures extending at least partially through the body in a direction between the first end and the second end.

12. The automated fiber placement assembly of claim 11, wherein the one or more apertures extends fully between the first end and the second end.

13. The automated fiber placement assembly of claim 11, wherein at least a portion of at least one aperture of the one or more apertures includes a variable diameter defined in a direction extending between the first end and the second end.

14. The automated fiber placement assembly of claim 13, wherein at least a portion of the aperture includes a constant diameter defined in the direction extending between the first end and the second end.

15. An automated fiber placement assembly for forming a component by application of a strip of fiber tows, the automated fiber placement assembly comprising:

a substrate comprising a non-uniform surface; and a pressure roller extending axially between a first end and an opposing second end, and having a body with an exterior surface for applying pressure to the strip of fiber tows against the non-uniform surface of the substrate when the pressure roller is rotated about a rotational axis;

wherein the pressure roller has a design configuration that is a varied physical configuration, a varied material property configuration, or both, and wherein the design configuration enables the pressure roller to apply the pressure uniformly to the strip of fiber tows in a manner complementary to the non-uniform surface; and wherein the design configuration is a varied material configuration in which a material property of the body varies axially, radially, or both axially and radially in a manner complementary to the non-uniform surface.

16. The automated fiber placement assembly of claim 15, wherein the body further includes an inner portion, and an outer portion exterior of the inner portion and defining the exterior surface, wherein the inner portion has a first material property and the outer portion has a second material property different than the first material property.

17. The automated fiber placement assembly of claim 16, wherein the outer portion defines the exterior surface of the pressure roller, and wherein the exterior surface is cylindrical.

18. The automated fiber placement assembly of claim 16, wherein the outer portion defines the exterior surface of the pressure roller, and wherein the exterior surface is non-cylindrical.

19. The automated fiber placement assembly of claim 11, wherein the one or more apertures are spaced from the rotational axis.

* * * * *